United States Patent
Borella et al.

(12)

(10) Patent No.: US 6,434,606 B1
(45) Date of Patent: Aug. 13, 2002

(54) SYSTEM FOR REAL TIME COMMUNICATION BUFFER MANAGEMENT

(75) Inventors: Michael S. Borella, Naperville; Ikhlaq S. Sidhu, Vernon Hills; Guido M. Schuster, Des Plaines; Jerry J. Mahler, Prospect Heights; Thomas J. Kostas, Evanston, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,561

(22) Filed: May 28, 1999

Related U.S. Application Data

(63) Continuation-in-part of application No. 08/942,446, filed on Oct. 1, 1997, now Pat. No. 6,175,871, and a continuation-in-part of application No. 09/241,689, filed on Feb. 2, 1999, now Pat. No. 6,360,271.

(51) Int. Cl.[7] .............................................. G06F 13/00
(52) U.S. Cl. ........................ 709/214; 709/231; 711/148
(58) Field of Search ................................ 709/231, 214; 711/148

(56) References Cited

U.S. PATENT DOCUMENTS 4,076,964 A  2/1978  Henrion et al. ............. 370/517

(List continued on next page.)

FOREIGN PATENT DOCUMENTS

WO  WO 95/22233  8/1995
WO  WO 96/15598  5/1996

OTHER PUBLICATIONS

International Search Report for PCT Application Serial No. PCT/US98/20506, Dated Mar. 26, 1999.

(List continued on next page.)

*Primary Examiner*—Kenneth R. Coulter
(74) *Attorney, Agent, or Firm*—McDonnell Boehnen Hulbert & Berghoff

(57) ABSTRACT

A system and method for receiving a transported stream of data packets includes a buffer management device for receiving the data packets, unpacking the data packets, and forwarding a stream of data frames. The system and method further includes a first jitter buffer for receiving the data frames from the buffer management device and buffering the data frames, and a second jitter buffer for receiving the data frames from the buffer management device and buffering the data frames. In addition, the system and method includes a computationally-desirable jitter buffer selected from the first jitter buffer or the second jitter buffer by comparing a first jitter buffer quality and a second jitter buffer quality. The system and method also includes a decoder for receiving buffered data frames from the computationally-desirable jitter buffer.

31 Claims, 13 Drawing Sheets

U.S. PATENT DOCUMENTS

| | | | | |
|---|---|---|---|---|
| 5,072,442 A | | 12/1991 | Todd | 370/265 |
| 5,091,905 A | | 2/1992 | Amada | 370/415 |
| 5,402,424 A | | 3/1995 | Kou | 370/324 |
| 5,534,937 A | | 7/1996 | Zhu et al. | 375/240.27 |
| 5,640,388 A | | 6/1997 | Woodhead et al. | 370/468 |
| 5,805,602 A | | 9/1998 | Cloutier et al. | 370/516 |
| 5,812,790 A | | 9/1998 | Randall | 709/247 |
| 5,859,979 A | | 1/1999 | Tung et al. | 709/228 |
| 5,870,412 A | | 2/1999 | Schuster et al. | 714/752 |
| 5,915,104 A | * | 6/1999 | Miller | 710/129 |
| 5,931,928 A | | 8/1999 | Brennan et al. | 710/68 |
| 5,936,616 A | * | 8/1999 | Torborg, Jr. et al. | 345/202 |
| 5,940,479 A | * | 8/1999 | Guy et al. | 379/93.01 |
| 5,949,975 A | | 9/1999 | Batty et al. | 709/213 |
| 5,996,018 A | | 11/1999 | Duault et al. | 709/234 |
| 6,005,846 A | | 12/1999 | Best et al. | 370/264 |
| 6,029,252 A | | 2/2000 | Manning | 713/500 |
| 6,031,848 A | | 2/2000 | Brennan | 370/522 |
| 6,081,844 A | | 6/2000 | Nowatzyk et al. | 709/233 |
| 6,161,160 A | | 12/2000 | Niu et al. | 710/310 |
| 6,167,050 A | * | 12/2000 | Chung | 370/395 |
| 6,175,871 B1 | * | 1/2001 | Schuster et al. | 709/231 |
| 6,259,691 B1 | * | 7/2001 | Naudus | 370/352 |
| 6,360,271 B1 | * | 3/2002 | Schuster et al. | 709/231 |
| 6,366,959 B1 | * | 4/2002 | Sidhu et al. | 709/231 |

OTHER PUBLICATIONS

"Internet Delay Measurements Using Test Traffic Installing and Hosting a Test Box," Henk Uijterwaal, RIPE NCC, http://www.ripe.net/test–traffic/Notes/RIPE__168/note.html (Mar. 1998).

"Internet Delay Measurements Using Test Traffic Design Note," Henk Uijetwaal and Olaf Kolkman, RIPE NCC, http://www.ripe.net/test–traffic/Notes/RIPE__158/ (May 1997).

"A One–Way Delay Metric for IPPM." Advanced Network & Services, *Network Working Group*, http://www.ietf.org/internet–draft–ietf–ippm–delay–o5.txt (Nov. 1998).

"Internet Protocol Performance Metrics—Evolution through Understanding," http://www.advanced.org/ippm.html (Aug. 1997).

"Test Traffic Project Homepage," Henk Uijterwaal, RIPE NCC, http://www.ripe.net/test–traffic/ (Nov. 1998).

"Qos Routing Mechanisms and OSPF Extensions," Guerin, et al., *Internet Engineering Task Force* (Dec. 1998).

Bolot et al., "Adaptive Error Control for Packet Video in the Internet," *Proc. Intern'l Conference on Image Processing*, pp. 25–28, Sep. 1996.

"Designing QoSMIC: A Quality of Service Sensitive Multicast Internet Protocol," Banerjea et al., INTERNET–DRAFT, Inter–Domain Multicast Routing (Apr. 1998).

Podolsky et al., "Simulation of FEC–Based Error Control for Packet Audio on the Internet," IEEE Infocom '98, San Francisco, CA, pp. 1–12, Mar. 1998.

Bolot et al., "The Case for FEC–Based Error Control for Packet Audio in the Internet." pp. 1–12, to appear in *ACM Multimedia Systems*.

Bolot et al., "Control Mechanisms for Packet–Audio in the Internet," In *Proc. IEEE Infocom '96*, San Francisco, CA, pp. 232–239, Apr. 1996.

Perkins et al., "Options for Repair of Streaming Media," Internet–Draft, The University College London, pp. 1–10, Mar. 13, 1998.

Kajijama et al, "Experiments of IP over ATM with Congestion Avoidance Flow Control: CEFLAR," *GLOBECOM 96*, pp. 484–489, Nov. 1996.

Bolot et al., "A Rate Control Mechanism for Packet Audio in the Internet," *INFOCOM 94*, pp. 1216–1223, Jun. 1994.

Chakrabarti et al., "Adaptive Control for Packet Video," *Proc. Of the Intern'l Conference on Multimedia Computine and Systems*, pp. 56–62, May 1994.

Sadka et al., "Rate Control Feedback Mechanisms for Packet Video Networks," *Electronic Letters*, vol. 32, No. 8, pp. 716–717, Apr. 1996.

International Telecommunication Union ITU–T Recommendation V.34, "A modern operating at data signaling rates of up to 28 800 bit/s for use on the general switched telephone network and on leased point–to–point 2–wire telephone–type circuits," ITU–T Study Group 14 (1993–1996).

International Telecommunication Union ITU–T Recommendation G.711, "Pulse code modulation (PCM) of voice frequencies," Extract from the *Blue Book*, 1988, 1993.

International Telecommunication Union ITU–T Recommendation G.723.1, "Dual rate speech coder for multimedia communications transmitting at 5.3 and 6.3 kbit/s," ITU–T Study Group 15 (1993–1996).

International Telecommunication Union ITU–T Recommendation G.729, Coding of speech at 8 kbit/s using conjugate–structure algebraic–code–excited linear–prediction (CS–ACELP), ITU–T Study Group 15 (1993–1996).

International Telecommunication Union ITU–T Recommendation G.729 Annex A, "Reduced complexity 8 kbit/s CS–ACELP speech codec," ITU–T Study Group 15 (1993–1996).

* cited by examiner

SYSTEM FOR REAL TIME COMMUNICATION BUFFER MANAGEMENT

This is a continuation-in-part application of patent application Ser. No. 08/942,446, entitled "Method and Apparatus for Real Time Communication Over Packet Networks," filed Oct. 1, 1997, now U.S. Pat. No. 6,175,871 and specifically incorporated in its entirety herein by reference. This is also a continuation-in-part application of U.S. patent application Ser. No. 09/241,689, entitled "System for Dynamic Jitter Buffer Management Based on Synchronized Clocks," filed on Feb. 2, 1999, now U.S. Pat. No. 6,360,271 and specifically incorporated in its entirety herein by reference.

REFERENCE TO COMPUTER PROGRAM LISTING APPENDICES SUBMITTED ON COMPACT DISC

The originally filed specification for the present application included Appendices A–C, which contained paper printouts of several computer program listings and an output file. Two compacts discs containing electronic text copies of the computer program listings and output file of Appendices A–C have been submitted for the present application. These electronic copies of Appendices A–C have been labeled with the appropriate identification for this application, and one of the compact discs has been labeled "Copy 1," while the other has been labeled "Copy 2." The compact disc labeled "Copy 2" is identical to the one labeled "Copy 1," and both compact discs are specifically incorporated herein by reference.

Each of the submitted compact discs is formatted for a PC type workstation with an MS-Windows based operating system, and includes the serial label number of 011129_1352. The following is a list of the folders and files on each of the two submitted compact discs:

Folder—Appendix A
File—buffer_mgmt.cc.txt (Size: 9 KB; Dated: Nov. 29, 2001)
Folder—Appendix B
File—VoIP Output File.txt (Size: 7 KB; Dated: Nov. 29, 2001)
Folder—Appendix C
File—buffer.h.txt (Size: 7KB; Dated: Nov. 29, 2001)
File—voicebuffer.cc.txt (Size: 13 KB; Dated: Nov. 29, 2001)
File—voicebuffer.h.txt (Size: 3 KB; Dated: Nov. 29, 2001)

COPYRIGHT NOTICE AND AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

This invention relates to the field of telecommunications and more specifically to a method and apparatus for choosing buffer size and error correction coding for real time communication over packet networks.

B. Description of Related Art and Advantages of the Invention

Real time communications such as audio or video can be encoded using various compression techniques. The encoded information can then be placed in data packets with time and sequence information and transported via non-guaranteed Quality of Service (QoS) packet networks. Non-guaranteed packet switched networks include a Local Area Network (LAN), Internet Protocol Network, frame relay network, or an interconnected mixture of such networks such as an Internet or Intranet. One underlying problem with non-guaranteed packet networks is that transported packets are subject to varying loss and delays. Therefore, for real-time communications, a tradeoff exists among the quality of the service, the interactive delay, and the utilized bandwidth. This tradeoff is a function of the selected coding scheme, the packetization scheme, the redundancy of information packeted within the packets, the receiver buffer size, the bandwidth restrictions, and the transporting characteristics of the transporting network.

One technique for transporting real time communication between two parties over a packet switched network requires that both parties have access to multimedia computers. These computers must be coupled to the transporting network. The transporting network could be an Intranet, an Internet, a wide area network (WAN), a local area network (LAN), or other type of network utilizing technologies such as Asynchronous Transfer Mode (ATM), Frame Relay, Carrier Sense Multiple Access, Token Ring, or the like. As in the case for home personal computers (PCs), both parties to the communication may be connected to the network via telephone lines. These telephone lines are in communication with a local hub associated with a central office switch and a Network Service provider. As used herein, the term "hub" refers to an access point of a communication infrastructure.

This communication technique however, has a number of disadvantages. For example, for a home-based PC connected to a network using an analog telephone line, the maximum bandwidth available depends on the condition of the line. Typically, this bandwidth will be no greater than approximately 3400 Hz. A known method for transmitting and receiving data at rates of up to 33.6 kbits/second over such a connection is described in Recommendation V.34, published by the International Telecommunication Union, Geneva, Switzerland.

Aside from a limited bandwidth, various delays inherent in the PC solution, such as sound card delays, modem delays, and other related delays are relatively high. Consequently, the PC-based communication technique is generally unattractive for real-time communication. As used herein, "real-time communication" refers to real-time audio, video, or a combination of the two.

Another typical disadvantage of PC-based communication, particularly with respect to PC-based telephone communications, is that the communicating PC receiving the call generally needs to be running at the time the call is received. This may be feasible for a corporate PC connected to an Intranet. However, such a connection may be burdensome for a home based PC, since the home PC may have to tie up a phone line.

Another disadvantage is that a PC-based conversation is similar to conversing over a speakerphone. Hence, privacy of conversation may be lost. Communicating over a speakerphone may also present problems in a typical office environment having high ambient noise or having close working arrangements.

In addition, PC-based telephone systems often require powerful and complex voice encoders and therefore require a large amount of processing capability. Even if these powerful voice encoders run on a particularly powerful PC, the encoders may slow down the PC to a point where the advantage of document sharing decreases, since the remaining processing power may be insufficient for a reasonable interactive conversation. Consequently, a caller may have to use less sophisticated encoders, thereby degrading the quality of the call.

A general problem encountered in packet switched networks, however, is that the network may drop or lose data packets. Packets may also be delayed during transportation from the sender to the receiver. Therefore, some of the packets at a receiving destination will be missing and others will be "jittered" and therefore arrive out of order.

In a packet switched network whose transporting characteristics vary relatively slowly, the immediate past transporting characteristics can be used to infer information about the immediate future transporting characteristics. The dynamic network transporting characteristics may be measured using such variables as packet loss, packet delay, packet burst loss, loss auto-correlation, bandwidth, and delay variation.

IP gateways, such as IP telephony receivers, may employ a configuration of computational buffers or jitter buffers to mask network-induced expansion and contraction of packet inter-arrival times. Although IP telephony transmitters may send packets with deterministic inter-departure times, IP networks such as the Internet will "jitter" (i.e., introduce delay variance) and lose packets as the packets are transported through some number of switches and routers before the packets arrive at the IP gateway, such as the IP telephony receiver. The greater the jitter buffer depth, the more jitter that the communication channel can mask.

If packet arrivals are highly skewed with respect to buffer depth, packets may be lost due to buffer overflow or buffer underflow. However, due to the interactive nature of real time communication over IP, particularly IP telephony, it is desirable to introduce as little jitter buffer latency as possible. Therefore, a buffer having a shallow depth is generally desired. IP telephony end-user quality of service is also degraded by packet loss introduced by the IP network itself. For example, an intermediate IP router in between the source and destination of the real-time communication may become temporarily overloaded, and as a result, will drop (i.e., delete) packets in response to the congestion. This packet loss causes audible clicks, pops, and gaps in a voice conversation, degrading the quality of the conversation.

Some packet loss may be masked through error-correction coding. Such error correction coding techniques may include frame replication (i.e., frame redundancy) or frame-based forward error correction (FEC). For example, related U.S. Pat. No. 5,870,412 entitled "Forward Error Correction System for Packet Based Real Time Media" describes a forward error correction code scheme for transmission of real time media signals and is fully herein incorporated by reference and to which the reader is directed for additional details. One disadvantage of utilizing techniques such as redundancy or FEC, however, is that they may increase the amount of information required per data packet and therefore the amount of required bandwidth. There is, therefore, a general need for an IP gateway that can dynamically adjust receiving properties based, in part, on dynamic transporting characteristics while also attempting to optimize bandwidth.

SUMMARY OF THE INVENTION

The present invention provides a gateway for receiving a transported stream of data packets. The gateway comprises a buffer management device for receiving the data packets, unpacking the data packets, and forwarding a stream of data frames. The gateway also comprises a first jitter buffer for receiving the data frames from the buffer management device and buffering the data frames, and a second jitter buffer for receiving the data frames from the buffer management device and buffering the data frames. In addition, the gateway comprises a computationally-desirable jitter buffer selected from the first jitter buffer or the second jitter buffer by comparing a first jitter buffer quality and a second jitter buffer quality. Additionally, the gateway comprises a decoder for receiving buffered data frames from the computationally-desirable jitter buffer.

The present invention also provides a method for receiving a transported stream of data packets comprising the steps of receiving the data packets at a management module, and unpacking the data packets at the management module. The method also comprises the steps of forwarding a first stream of data frames to a first jitter buffer, and forwarding a second stream of data frames to a second jitter buffer. Moreover, the method comprises the steps of buffering the data frames at the first jitter buffer and the second jitter buffer, computing a first jitter buffer quality for the first jitter buffer, and computing a second jitter buffer quality for the second jitter buffer. The method further comprises the steps of selecting either the first or the second jitter buffer as a computationally-desirable jitter buffer based on the first and second jitter buffer qualities, and forwarding the buffered data frames from the computationally-desirable buffer to a decoder.

In addition, the present invention provides a receiver for receiving a transported stream of data packets. The receiver comprises a buffer management device for receiving the data packets, unpacking the data packets and forwarding a stream of data frames. The receiver also comprises a buffer array having a computationally-desirable buffer and a plurality of virtual buffers, with each buffer of the buffer array receiving and buffering the data frames from the buffer management device. The receiver further comprises a decoder for receiving buffered data frames from the computationally-desirable buffer.

BRIEF DESCRIPTION OF THE DRAWINGS

Preferred embodiments of the present invention are described herein with reference to the drawings, in which.

DESCRIPTION OF PREFERRED EMBODIMENTS

Figure 1:
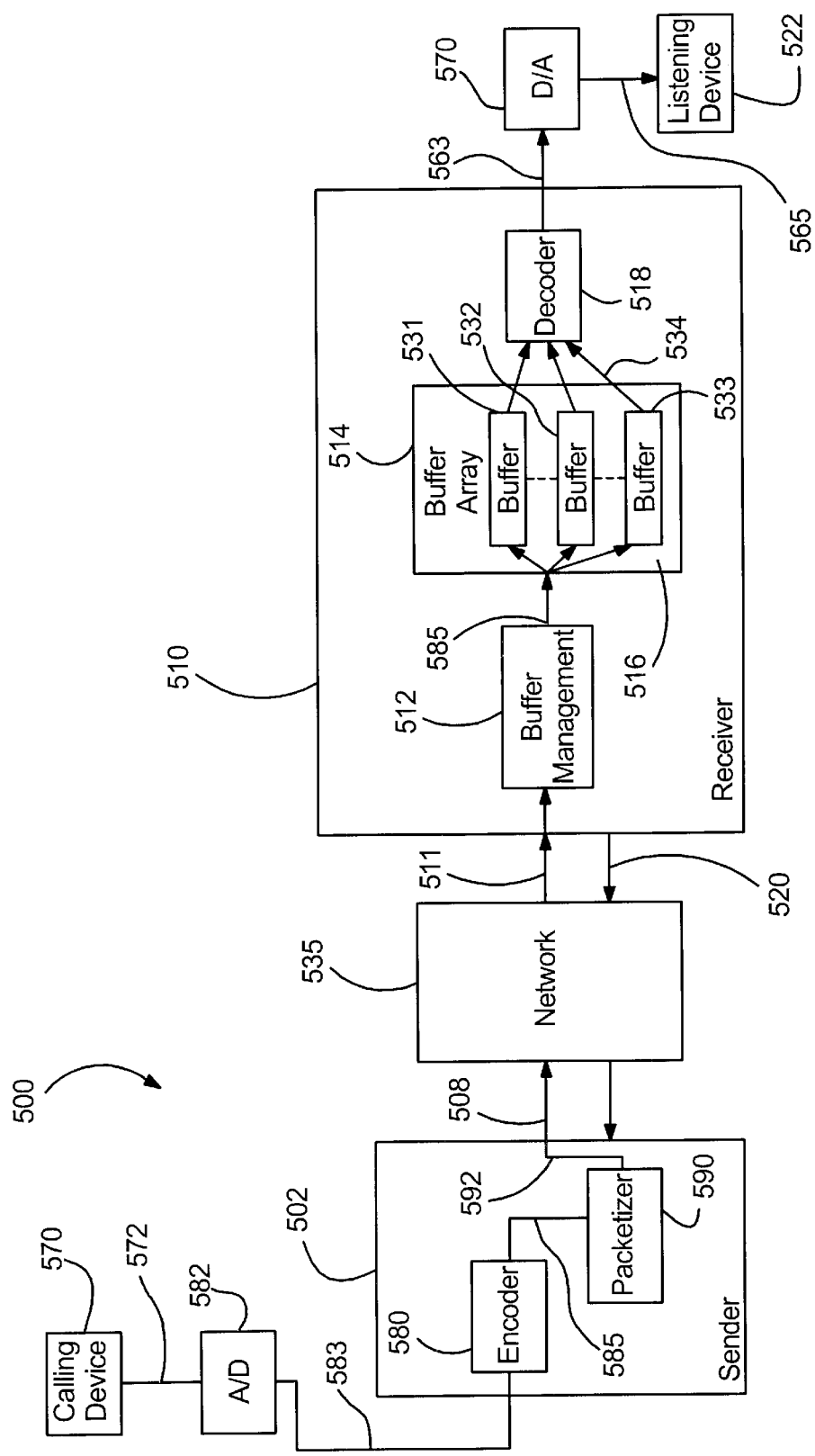
FIG. 1 illustrates a preferred communication channel of the present invention including a sender and a receiver.

FIG. 1 illustrates a preferred communication channel 500 of the present invention. Communication channel 500 generally comprises a sender 502, a transporting medium 535, and a receiver 510. Receiver 510 comprises a buffer management module 512, a buffer array 514 containing a set of jitter buffers 516, and a decoder 518. As explained in more detail below, each jitter buffer 516 may be a computationally-desirable or real jitter buffer that actually sends information to the decoder 518, or alternatively, a virtual jitter buffer that does not send information to the decoder 518. It will be appreciated that the input and output media may alternatively engage in interactive communication, in which case the scenario depicted in FIG. 1 could be revised to be symmetric. In that case, for instance, the transmitter or sender would also perform the functions of a receiver, such as receiver 510, and receiver 510 would also perform the functions of a transmitter, such as sender 502. Further, the principles described herein could be applied in either or both directions, such as for an interactive telephone conversation.

Exemplary receiver 510 comprises a single array of jitter buffers. Alternatively, receiver 510 includes more than one array of jitter buffers. In such an alternative embodiment, the various sets of jitter buffers may have common characteristics with one another. For example, a receiver may contain three sets of jitter buffers wherein the first set of jitter buffers utilize error correction coding, the second set of buffers utilize redundancy, and the third set may utilize a large buffer depth without error correction or redundancy. For further details, the reader is directed to the method and apparatus for selecting buffer size and error correction coding for real time communication disclosed in United States patent application Ser. No. 09/322,836, now U.S. Pat. No. 6,366,959, entitled "Method and Apparatus for Real Time Communication System Buffer Size and Error Correction Coding Selection," commonly assigned with the present invention, and specifically incorporated in its entirety herein by reference.

Communication channel 500 and its method of operation will now be described with reference to FIG. 1. A calling device 570 generates a real time media input signal 572, preferably a telephone call. Alternatively, the input signal 572 is video, multimedia, a streaming application, or a combination thereof. The input signal 572 is communicated to an analog-to-digital (A/D) converter 582. The A/D converter 582 converts the input signal 572 to a digital signal 583. Preferably, where the input signal 572 is a telephone call, the digital signal 583 is digital speech representation.

The digital signal 583 is communicated to an encoder 580 of sender 502. In the case of a telephone call, digital signal 583 is communicated to the encoder 580 over a telephone line. The digital signal 583 (preferably in Pulse Code Modulated (PCM) form) is compressed and partitioned by encoder 580 into a sequence of frames 585. In other words, encoder 580 encodes digital signal 583.

Preferably, in the case where the communication channel 500 is used to communicate voice, encoder 580 is an ITU voice encoder complying with Recommendation G.723.1. Recommendation G.723.1 describes a code excited linear predictive encoder (CELP). Recommendation G.723.1 specifies a coded representation used for compressing speech or another audio signal component of multimedia services at a low bit rate as part of the overall H.324 family of standards. Recommendation G.723.1 is entitled "DUAL RATE SPEECH ENCODER FOR MULTIMEDIA COMMUNICATIONS TRANSMITTING AT 5.3 & 6.3 KBITS/S" and is published by the Telecommunication Standardization Sector of the ITU. Recommendation G.723.1 is herein entirely incorporated by reference and to which the reader is directed for further details. Alternatively, voice encoders complying with other standards or specifications, such as ITU Recommendations G.711 or G.729A, both of which are specifically incorporated in their entirety herein by reference, may be used.

Preferably, the digital signal 583 sent to the encoder 580 is digital speech representation sampled at 8000 Hz. Each sample of the digital signal 583 is represented by a signed 16 bit integer. The encoder 580, preferably a G.723.1 encoder, segments the digital signal 583 into one or more frames 585. Preferably, the first byte of each frame 585 indicates the number of bytes in the frame, while the remainder of each frame 585 contains the segmented digital signal 583. In addition, with a G.723.1 encoder, each frame is preferably 30 milli-seconds (ms) in length. Thus, at the preferred sampling rate of 8000 Hz, 30 ms represents 240 samples. Moreover, in a group of frames, the frames are preferably arranged in decreasing sequential order.

The preferred G.723.1 encoder can operate at two different bit rates, a low rate of 5.3 kbits/seconds or a high rate of 6.3 kbits/seconds. In the high rate setting of 6.3 kbit/s, 480 bytes (i.e., 240 samples times 2 bytes/sample) are compressed to 24 bytes. In this high rate setting, where the input signal 572 is voice, the encoding results in a quality that is close to toll quality. In the low rate setting of 5.3 kbits/s, 480 bytes are compressed to 20 bytes. Therefore, between the low and high rate setting, the compression ratio varies from 20 to 24.

Preferably, encoder 580 utilizes silence detection. Silence begins at the end of a talk spurt or burst, which includes the one or more frames that make up the digital signal (i.e., digital speech representation). Silence ends at the beginning of the next talk spurt or burst. The G723.1 silence detection uses a special frame entitled Silence Insertion Descriptor (SID) frame. SID frame generation is described in Recommendation G723.1, which has been herein entirely incorporated by reference and to which the reader is directed for further details. During a "silence," as that term is used herein, no voice data frames are generated by the encoder 580. An SID frame defines when a silence begins, preferably at the end of a talk spurt or burst. After encoder 580 transmits an SID frame, no further voice data frames are transmitted until the current silence ends. Updated SID frames may, however, be sent.

One advantage of this silencing technique is that it reduces the required overall transfer rate. Moreover, silence detection allows for the periodic and independent evaluation of each of the jitter buffers contained in buffer array 514 of receiver 510. Communication channel 500 can thereby periodically monitor the varying transportation characteristics of network 535. Consequently, the channel may alter which jitter buffer of array 514 that the channel uses during a specific time period of media playout.

Figure 2:
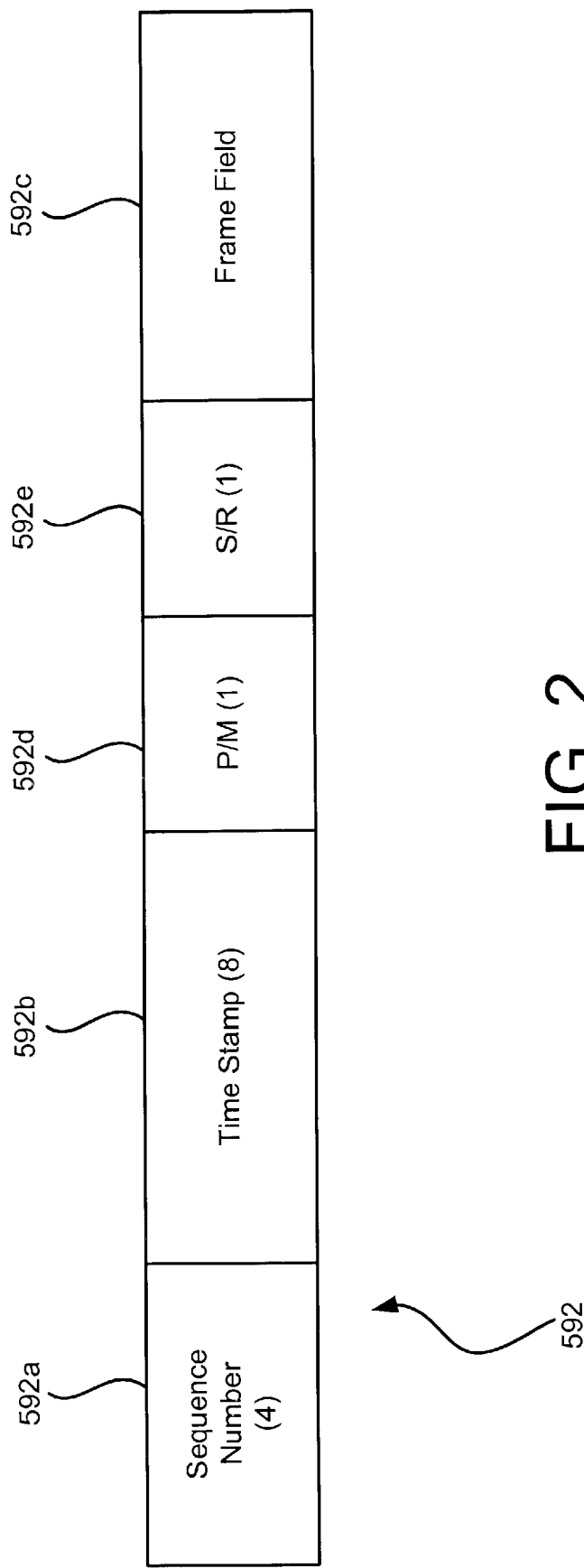
FIG. 2 shows a preferred format for a data packet used with the communication channel of FIG. 1.

Packetizer 590 packets the frames 585 into a plurality of data packets 592, which are in turn ordered in a data packet sequence 508 and transported by the transporting network 535 to the receiver 510. FIG. 2 shows a preferred format created by the packetizer 590 for the data packets 592. Preferably, packetizer 590 places a sequence number 592a and a time stamp 592b into each data packet 592 in front of a frame field 592c containing one or more frames 585. The sequence number 592a identifies data packet ordering, and is preferably comprised of four bytes. The time stamp 592b identifies the time a specific data packet 592 was created, and is preferably comprised of eight bytes, with the first four bytes containing the number of seconds since 12 a.m., Jan. 1, 1970, and the second four bytes contain the number of microseconds within the current second (i.e., 0–999,999). It should be understood, however, that these sequence number and time stamp formats are merely exemplary, and other sequence number and time stamp formats may be used with the present invention.

As shown in FIG. 2, the format for the data packets 592 may also include a Protocol/Message (P/M) byte 592d, with the protocol portion being the four high-order bits, and the message portion being the four low-order bits. Preferably, the only valid values for the protocol and message portions are "0000." Similarly, the data packet format may further include a Spare/Redundancy (S/R) byte 592e, with the spare portion being the four high-order bits, and the redundancy portion being the four low-order bits. While the spare bits may be used for performance evaluation purposes to allow the sender 502 to piggyback an end-of-transmission token onto the last frame 585 that will be transmitted in a conversation, the spare bits are preferably ignored by the receiver 510. On the other hand, the redundancy bits "0000" through "0111" may be used to indicate the number of frames 585 in the frame field 592c of the data packet 592. The redundancy bits "1000" through "1111," however, may be used to indicate different Forward Error Correction (FEC) schemes, as discussed in more detail below.

Figure 3:
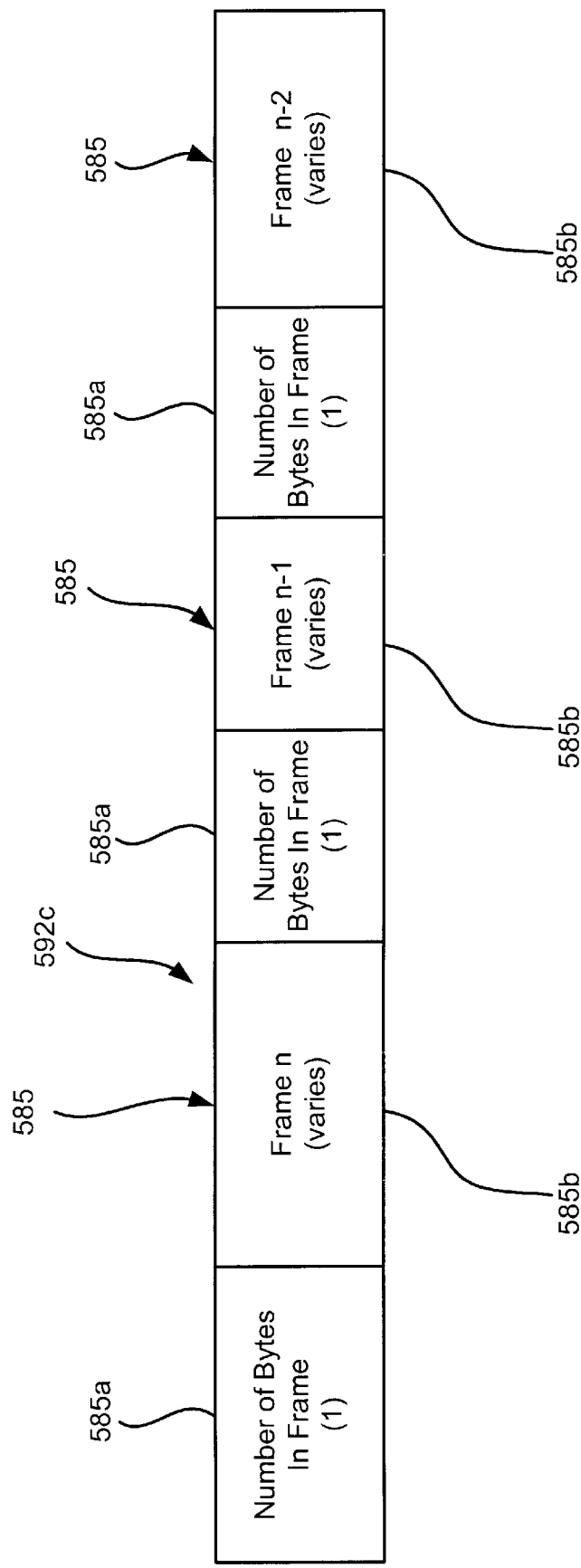
FIG. 3 shows a preferred format for a frame field of the data packet of FIG. 2, with a redundancy value of three.

As noted above, the data packets 592 may also include error correction coding, such as redundancy or FEC. FIG. 3 shows a frame field 592c for a data packet 592 with redundancy set to three. The first byte 585a of each frame 585 in the frame field 592c indicates the number of bytes in the frame (e.g., 20 bytes for 5.3 Kbps G.723.1), while the remainder of the frame contains a segmented voice signal 585b. Since redundancy is set to three, there are preferably three frames 585 in the frame field 592c, namely the original frame (frame n) being transmitted with data packet n, the frame (frame n-1) originally transmitted with the preceding packet n-1, and the frame (frame n-2) originally transmitted with the packet n-2 that preceded the packet n-1, as shown in FIG. 3. Thus, with a redundancy of three, not only is frame n being transmitted in the frame field 592c of the data packet n, but so are the two frames (i.e., frame n-1 and frame n-2) of the preceding data packets (i.e., packet n-1 and packet n-2). As a result, the receiver 510 has an extra copy of frame n-1 and frame n-2 to use in case either of the data packets n-1 and n-2 were lost during transmission through the transporting network 535.

As discussed in more detail below, each of the jitter buffers in the buffer array 514 may use a different redundancy value than the other jitter buffers. In order to evaluate the performance of the jitter virtual buffers, (compared to the computationally-desirable or real jitter buffer), based on redundancy values, redundant frames (i.e., frame n-1 and/or frame n-2) may be ignored by a virtual jitter buffer with a lower redundancy value than the computationally-desirable or real jitter buffer, or created by a virtual jitter buffer with a higher redundancy value than the computationally-desirable or real jitter buffer. Any extra redundant frames that need to be created may contain arbitrary data, since these extra redundant frames will not get played out by the virtual jitter buffers. It should also be understood that a redundancy value of one is the equivalent of no redundancy being used for error correction coding, since only the original frame n is being transmitted with the data packet n.

Figure 4A:
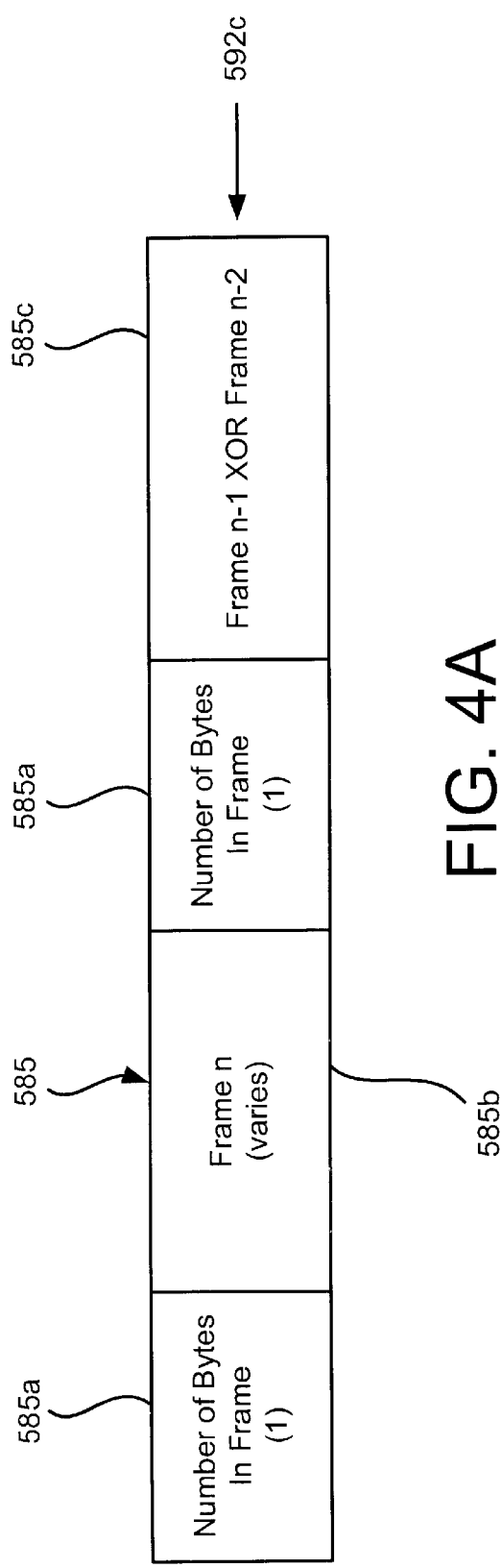
FIGS. 4A—4B show preferred formats for frame fields of the data packet of FIG. 2, with a first and a second forward error correction scheme, respectively.
Figure 4B:
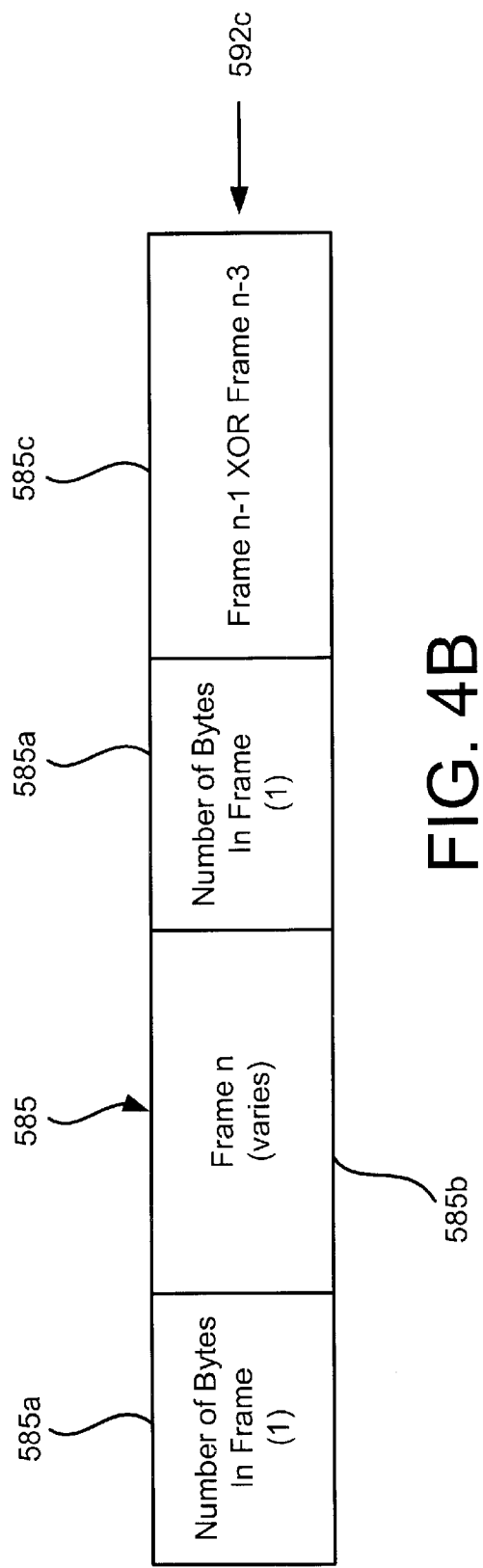

FIGS. 4A–4B shows two frame fields 592c for data packets 592 with two different FEC schemes. Once again, the first byte 585a of each frame 585 in the frame field 592c preferably indicates the number of bytes in the frame (e.g., 20 bytes for 5.3 Kbps G.723.1), while the remainder of the frame contains a segmented voice signal 585b. In contrast with redundancy, there is preferably only one frame 585 in the frame field 592c, namely the original frame (frame n) being transmitted with data packet n. An FEC frame 585c, however, is preferably appended to the original frame n. The FEC frame 585c may have any number of different schemes, including, but not limited to, a first scheme and a second scheme. The first scheme is preferably indicated by redundancy bits "1000," and contains the exclusive bitwise OR of the frame n-1 originally transmitted with the preceding packet n-1, and the frame n-2 originally transmitted with the packet n-2 that preceded the packet n-1 (i.e., frame n-1 XOR frame n-2), as shown in FIG. 4A. The second scheme is preferably indicated by redundancy bits "1001," and contains the exclusive bitwise OR of the frame n-1 originally transmitted with the preceding packet n-1, and the frame n-3 originally transmitted with the packet n-3 that preceded the packet n-2 (i.e., frame n-1 XOR frame n-3), as shown in FIG. 4B. As known in the art, FEC frames and schemes may be used to recover frames that were lost during transmission through a transporting network. In addition, while the FEC frame is preferably appended to the original frame n of the data packet n, it should be understood that the FEC frame may be sent as part of a separate packet (i.e., an FEC packet).

As discussed in more detail below, each of the jitter buffers in the buffer array 514 may use a different FEC frame scheme than the other jitter buffers. In order to evaluate the performance of the virtual jitter buffers (compared to the computationally-desirable or real jitter buffer) based on FEC schemes, the virtual jitter buffers may simulate FEC schemes, ignoring any redundancies. Any frames recovered with this simulation process may contain arbitrary data, since these recovered frames will not get played out by the virtual jitter buffers.

Each data packet time stamp enables receiver 510 to evaluate dynamic transporting characteristics of the transporting network 535. These transporting characteristics determine how the packetizer 590 packetizes the frames 585 and how receiver 510 unpacks these frames. More preferably, transporting characteristics also determine whether packetizer 590 utilizes redundancy or an alternative error correction coding, such as FEC. Related U.S. patent application Ser. No. 08/942,446, now U.S. Pat. No. 6,175, 871, entitled "Method and Apparatus For Real Time Communication Over Packet Networks," describes a system for communicating real time media over a non-guaranteed network such as network 535 shown in FIG. 1. U.S. patent application Ser. No. 08/942,446, now U.S. Pat. No. 6,175, 871 has been entirely incorporated herein by reference and the reader is directed to it for further details. Varying transporting characteristics of network 535 include such characteristics as the standard deviation of one-way delay or the round trip time for each transported data packet, packet jitter, packet loss rates, and packet delay.

Packet delay may generally be determined from the packet round trip time which is calculated by transporting a copy of the time stamp value back to the sender 502, and comparing the received time of the copy with the time stamp value contained therein. This information may be sent by the receiver 510 to the sender 502 via feedback packet 520. The standard deviation of one-way delay is typically approximated by averaging the absolute value of differences between time stamp values and received times for each received packet.

Receiver 510 receives a sequence of data packets 511. This sequence of data packets 511 may vary from the sequence of data packets 508 originally communicated to the transporting network 535. The variance between the two data packet sequences 508, 511 is a function of varying transporting characteristics.

Because preferred transporting network 535 is a non-guaranteed packet switched network, receiver 510 may receive packets out of order vis-a-vis other data packets comprising the originally transported packet sequence 508. To mask this jittering of data packet stream 508, packetizer 590 adds sequence numbers to frames 585, as explained above. Receiver 510 has a buffer array 514 that stores relevant data for frames. As long as the sequence number of an arriving frame is greater than the sequence number of the frame being played out by decoder 518, the sequence number is used to put the unpacked frame at its correct sequential position in each of the jitter buffers 520. Therefore, the larger the jitter buffer size, the later a frame can arrive at receiver 510 and still be placed in a to-be-played-out frame sequence. On the other hand, as jitter buffer size increases, the larger the overall delay can be in transporting voice signals 583 from sender 502 to receiver 510.

Receiver 510 includes a buffer management module 512, a buffer array 514, and decoder 518. Module 512 receives incoming data packet sequence 511. Initially, the module 512 strips away the packet header and reads the data packets contained in the data packet stream 511. Module 512 then unpacks the incoming data packet stream 511 and recovers the frames 585. The module 512 also extracts any error correcting codes present in the data packet stream 511. If the module 512 finds any error correcting codes, the module 512 preferably decides if any lost frames can be recovered on any of the jitter buffers, and inserts the recovered frames into the appropriate jitter buffer or buffers. Alternatively, the jitter buffers themselves may be given the error correcting codes by the module 512 to decide individually whether or not any lost frames can be recovered, and if so, the jitter buffers may insert any recovered frames into themselves.

Figure 5:
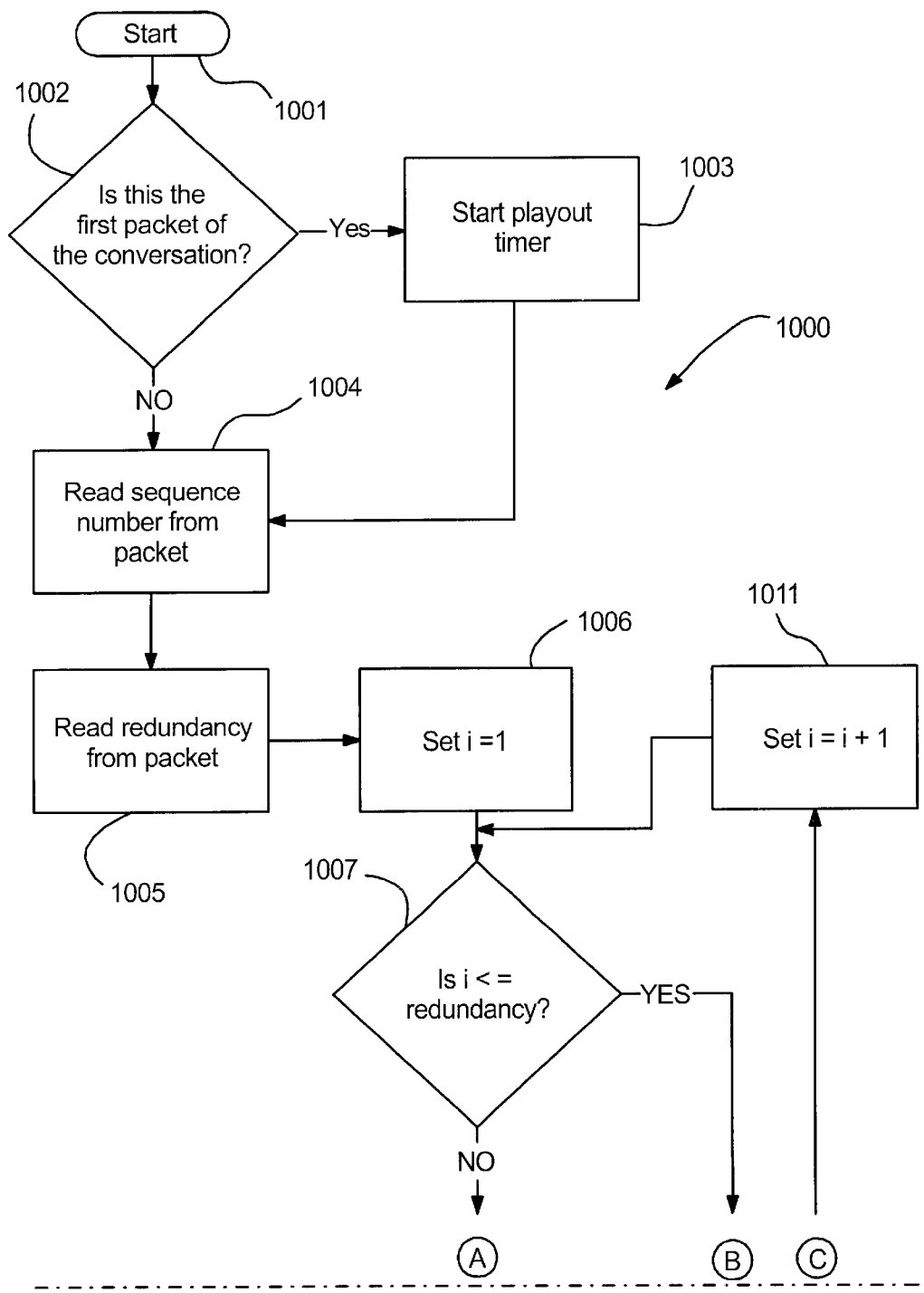
FIG. 5 provides a flowchart illustrating a packet arrival function of a buffer management module of the receiver of FIG. 1.
Figure 5:
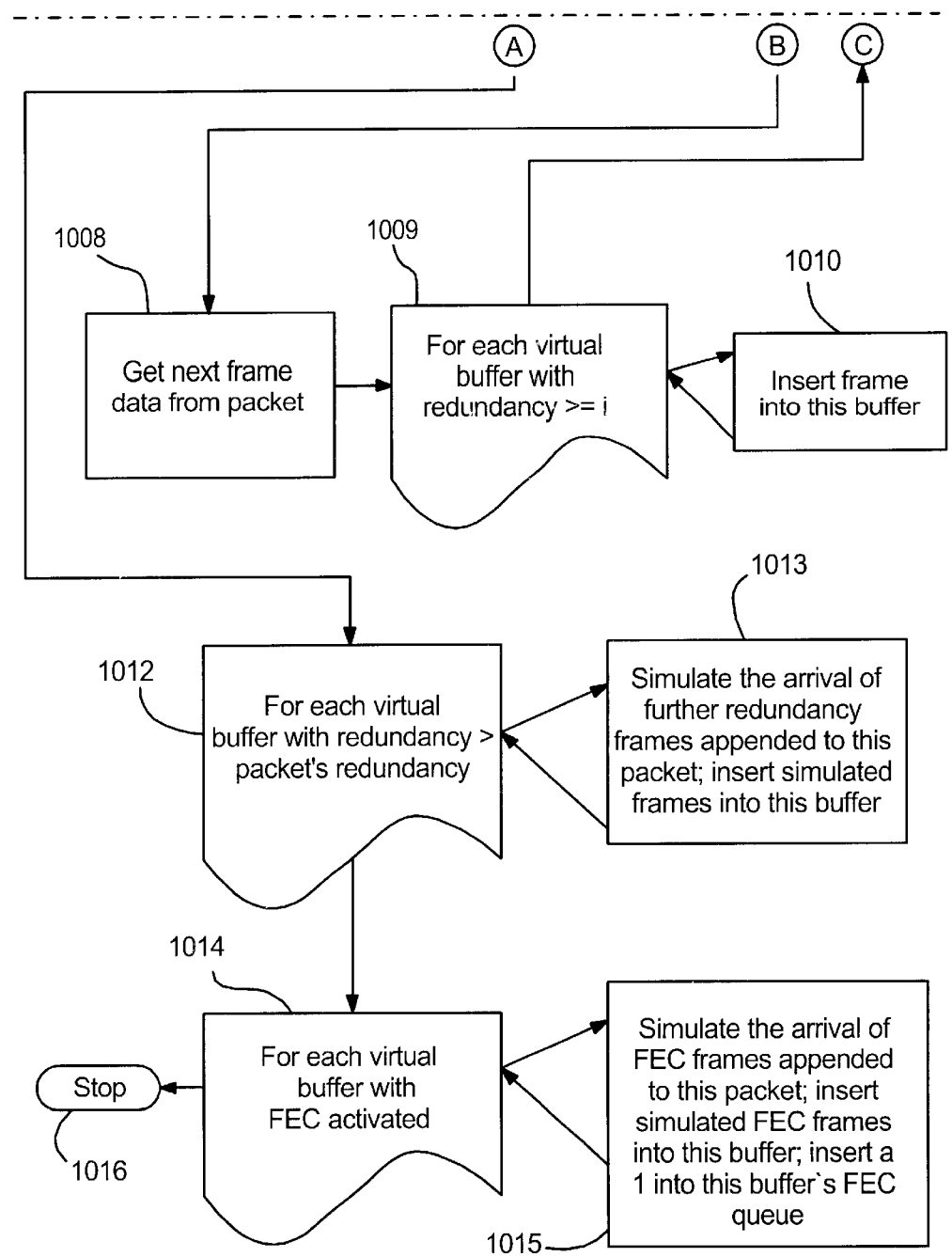

The various functions and routines performed by the buffer management module 512 are set forth in the detailed C++ language source code attached hereto at Appendix A under the file name "buffer_mgmt.cc." The unpacking of data packets and recovery of lost frames is represented in the source code of Appendix A by the function command of "packet_arrival ( )." A flowchart of this packet arrival function 1000 is also shown in FIG. 5. The packet arrival function starts in Step 1001 with the arrival of a data packet at the module 512. In Step 1002, a determination is made of whether the data packet is the first packet (i.e., data packet n) of the conversation or talk spurt. If so, a playout timer is started in Step 1003, and then the sequence number from the packet is read in Step 1004. If not, Step 1003 is skipped. After reading the sequence number from the packet in Step 1004, the redundancy is read from the packet in Step 1005.

At this point, a counter variable, i, is set to one in Step 1006. Next, a determination is made of whether the counter variable, i, is less than or equal to the redundancy value in Step 1007. If so, the first frame (i.e., frame n) is unpacked from the data packet (i.e., data packet n) in Step 1008. According to Step 1009, for each virtual buffer with a redundancy greater than or equal to the counter variable, i, a frame is inserted into the buffer in Step 1010. In addition, the counter variable, i, is increased by one in Step 1011, and Step 1007 is repeated.

If the counter variable, i, is greater than the redundancy value, the packet arrival function continues with Step 1012. For each virtual jitter buffer with a redundancy value greater than the redundancy value of the data packet, a simulation of the arrival of a further redundant frame is appended to the data packet, and inserted into the virtual jitter buffer in Step 1013. This process is repeated until the redundancy value of the virtual jitter buffer is satisfied. The packet arrival function then continues with Step 1014. For each virtual jitter buffer with FEC activated, a simulation of the arrival of FEC frames is appended to the data packet, to the extent necessary, and inserted into the virtual buffer in Step 1015. Finally, the packet arrival function stops with Step 1016.

Preferably, but not necessarily, each jitter buffer also has an associated FEC buffer with an FEC queue (not shown). Each FEC buffer is a management buffer that is synchronized in terms of sequence numbers and buffer depth with its associated jitter buffer. The FEC queue of each FEC buffer is comprised of an indicator sequence of "0's" and "1's" (rather than data packets or frames), such that the "0's" represent data packets that have not yet been received by the module 512, and the "1's" represent data packets that have been received by the module 512. Specifically, for each data packet that fails to arrive at the module 512 (i.e., is missing), a "0" may be inserted into the tail end of the FEC queue associated with each jitter buffer. In contrast, for each data packet that arrives at the module 512, a "1" may be inserted into the tail end of the FEC queue associated with each jitter buffer, as shown in Step 1015 of FIG. 5.

FEC buffers allow efficient determination of which data packets in a sequence have arrived, and depending on the FEC scheme being used, whether or not a given missing data packet can be reconstructed. For example, if packets n and n−2 have been received by the module 512, the FEC buffer queue will consist of the string "101." The module 512 needs only to look at the FEC buffer queue to determine that packets n and n−2 have arrived, but that packet n−1 has not arrived. If the first FEC scheme described above was being used by the module 512, and data packet n+1 is the next packet to arrive at the module 512, then the lost data packet n−1 can be reconstructed through FEC of data packet n+1. It should be understood, however, that the module 512 may examine the actual jitter buffer queues, rather than their FEC buffer queues, to determine which data packets in a sequence have arrived, and whether or not missing data packets can be reconstructed. In such an arrangement, the use and presence of FEC buffers would not be necessary.

As set forth in the source code of Appendix A, the module 512 is able to perform several other functions besides unpacking data packets and recovering lost frames (i.e., the packet arrival function). For instance, the module 512 is capable of accepting jitter buffer parameters from an administrative input, such as a configuration file, as represented in the source code of Appendix A by the function command of "read_vb_conf_file ( )." The configuration file may be statically or dynamically set up to provide the module 512 with varying parameters for the jitter buffers, such as maximum buffer length, playout, redundancy, and FEC variables. An example of the types of parameters for sixteen jitter buffers is attached hereto at Appendix B.

The buffer management module 512 is also capable of calling a timeout every n ms, where n is the frame length in time of the decoder 518 being used (i.e., 30 ms for G.723.1, 10 ms for G729A, or a variable number of ms for G.711, such as 10 ms, 15 ms, or 30 ms). This timeout is represented in the source code of Appendix A by the function command of "time_out ( )." In order to accomplish this timeout function, the module 512 preferably receives a hard or soft interrupt from a system clock at regular intervals (i.e., every n ms), and passes the interrupt to each of the jitter buffers. An example of a system clock suitable for the present invention is disclosed in U.S. patent application Ser. No. 09/241,689, now U.S. Pat. No. 6,360,271, entitled "System for Dynamic Jitter Buffer Management Based on Synchronized Clocks," which has already been specifically incorporated in its entirety herein by reference. Each timeout interrupt from the module 512 indicates to the computationally-desirable or real jitter buffer that a frame should be played out (i.e., passed to the decoder 518).

The module 512 is also capable of determining whether the jitter buffers are empty, and de-allocating and deleting (i.e., killing) the jitter buffers. These capabilities of the module 512 are represented in the source code of Appendix A by the function commands of "all_empty ( )" and "kill_buffers ( )," respectively. In addition, the module 512 is preferably capable of determining the performance of each jitter buffer, as explained in more detail below. Also, the module 512 is preferably capable of resetting the computationally-desirable or real jitter buffer at the end of each talk spurt (i.e., during silence periods) to be the jitter buffer with the best performance over the previous talk spurt.

As stated above, frames 585 are passed by the module 512 to buffer array 514. Redundant frames are discarded and not buffered if their original frames have been previously buffered. Preferably, buffer array 514 comprises a plurality of jitter buffers 516, each of which may be either a computationally-desirable (i.e., real) jitter buffer or a virtual jitter buffer. Each jitter buffer receives a copy of the frames 585 from the module 512. Related U.S. patent application Ser. No. 09/241,689, now U.S. Pat. No. 6,360,271, entitled "System for Dynamic Jitter Buffer Management Based on Synchronized Clocks," describes an exemplary management system for dynamically jitter buffering a sequence of packets, and the reader is directed to this application for further details.

Module 512 reads the sequence number and the time stamp of a current frame. Redundant frames associated with the current frame have the same time stamp as the current frame since, within a given packet, redundant and current frames were both originally communicated from the packetizer 590 at approximately the same point in time. Since the order or sequence of the redundant frames is known, the redundant frame sequence numbers can be inferred from the current frame sequence number.

In an exemplary embodiment, the buffer array 514 comprises three jitter buffers, namely jitter buffers 531, 532, and 533. It should be understood, however, that any desirable number of jitter buffers may be used (i.e., 2, 16, 100, etc.), depending on operating and user preferences. As set forth above, each jitter buffer 531, 532, 533 preferably has a frame queue for buffering or storing frames, and preferably, but not necessarily, an FEC buffer for error correction coding, such as FEC. As will be discussed, each jitter buffer has an associated jitter buffer quality, which is periodically, independently evaluated. Based on this evaluation, a computationally-desirable jitter buffer is selected for a given time period. The selected jitter buffer then acts as a "real" jitter buffer for the given time period, thereby passing any buffered frames to the decoder 518 for playout. It is only the computationally-desirable or real jitter buffer that forwards frames to the decoder 518. For example, if jitter buffer 533 is selected as the computationally-desirable or real jitter buffer during a certain time period, only buffer 533 passes frames 534 to decoder 518. The other jitter buffers (i.e., jitter buffers 531 and 532) are merely virtual jitter buffers, and thus do not playout frames to the decoder 518.

Each jitter buffer is capable of performing various functions and routines as set forth in the detailed C++ language source code attached hereto at Appendix C, under the file names "VoiceBuffer.cc," "VoiceBuffer.h," and "Buffer.h." It should be understood that, according to standard C++ convention, the longer methods of the buffer objects are defined in a C++ (.cc) file, while the simpler methods are defined in a header (.h) file. In addition, it should also be understood that, while the term voice buffer is used in the source code of Appendix C instead of jitter buffer, the terms voice buffer and jitter buffer are synonyms, and may be used interchangeably throughout the present application and attached source codes.

Some of the variables used in the source code of Appendix C include "fec_t fec_," "bool real," "int playout," "int ticks_," and "int redundancy." The "fec_t fec_" variable represents the method of FEC to be used by the virtual buffers. The "bool real" variable is true if the jitter buffer is real, and false if the jitter buffer is not real (i.e., virtual). In addition, the "int playout" variable represents the number of frame durations to wait until the first packet is played out, and the "int ticks_" variable represents the number of frame durations elapsed since the arrival of the first packet. Also, the "int redundancy" variable represents the redundancy value used by the jitter buffers.

Figure 6:
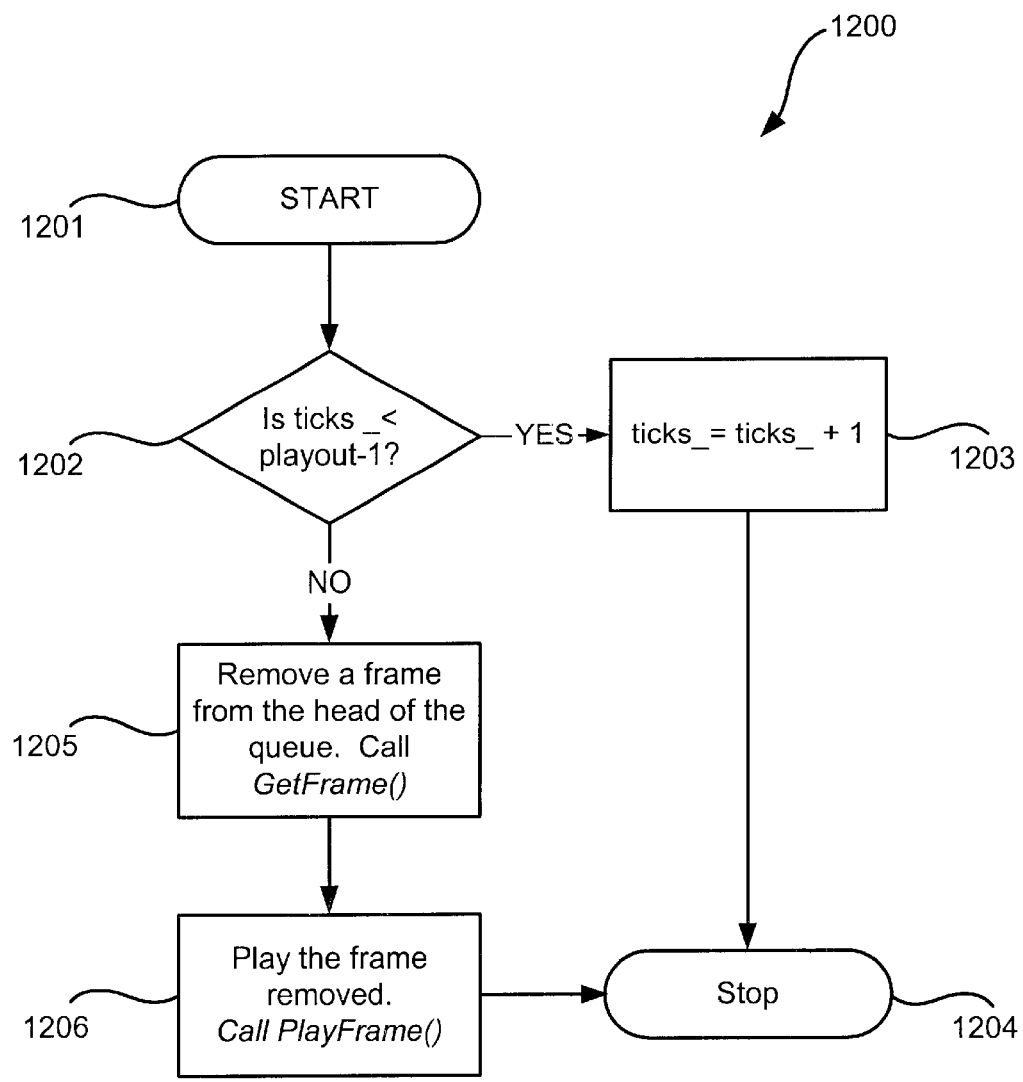
FIG. 6 provides a flowchart illustrating a time out function of a jitter buffer of the receiver of FIG. 1.

The functions of each jitter buffer will now be defined with reference to the source codes of Appendix C, as well as the flow charts shown in FIGS. 6–10. Each jitter buffer is preferably capable of determining whether it is a real or virtual jitter buffer, and is also capable of reporting its current status. This status reporting is represented in the source codes of Appendix C by the function command of "Status ( )." Each jitter buffer is also capable of performing a time out function 1200, as shown in the flow chart of FIG. 6. This time out function 1200 is represented in the source codes of Appendix C by the function command of "TimeOut ( )." As shown in FIG. 6, the time out function 1200 starts with Step 1201. In Step 1202, a determination is made of whether the number of frame durations elapsed since the arrival of the first packet (i.e., ticks_) is less than the number of frame durations necessary for the first packet to be played out (i.e., playout). If so, the time out function 1200 increases the number of frame durations elapsed since the arrival of the first packet (i.e., ticks_) by one, and the time out function 1200 stops in Step 1204. Otherwise, a frame is removed from the front or head of the jitter buffer's queue in Step 1205. Step 1205 is represented in the source codes of Appendix C by the function command of "GetFrame ( )." Next, in Step 1206, the removed frame is passed to the play frame function, which is described below, and the time out function 1200 stops with Step 1204.

Figure 7:
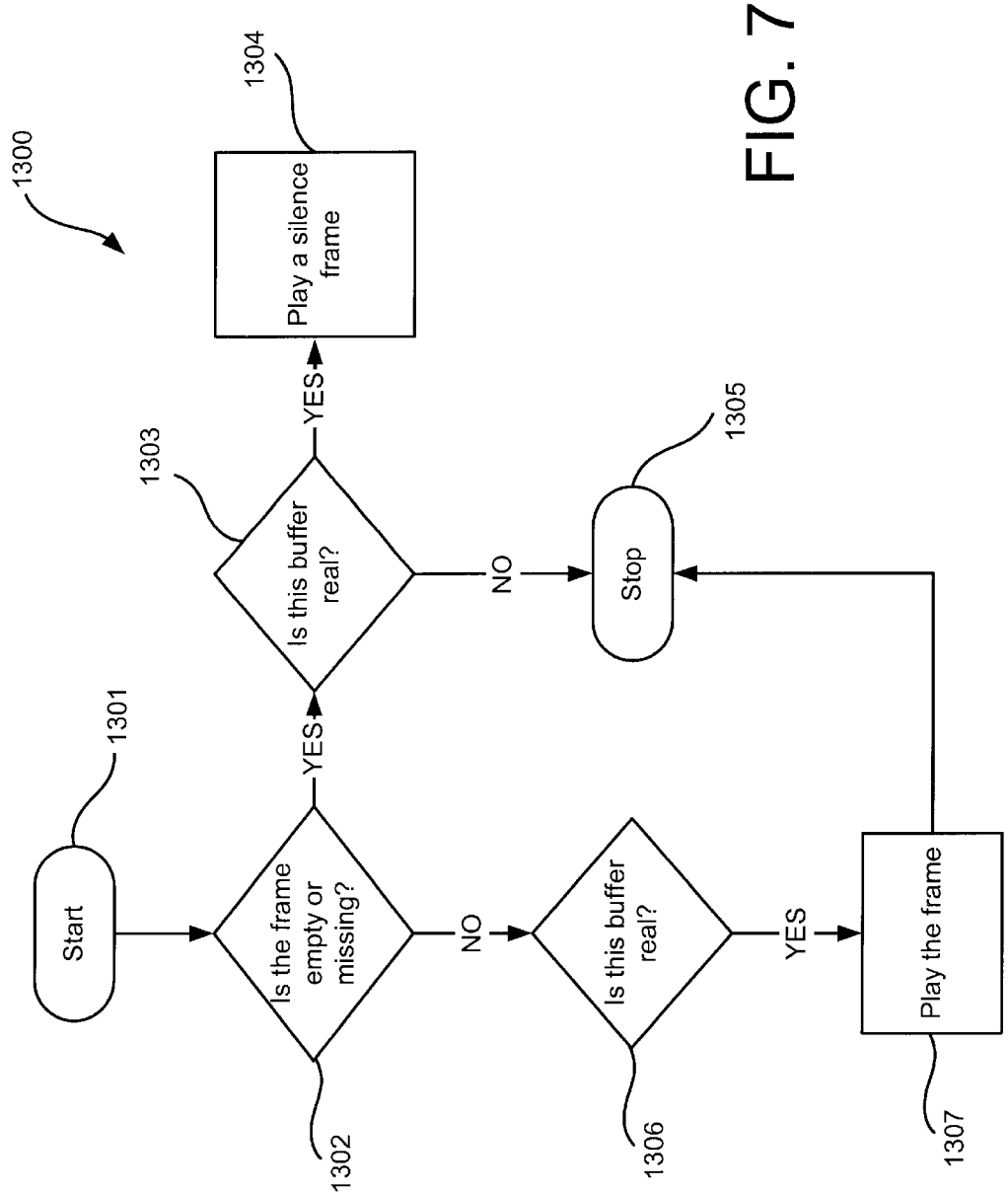
FIG. 7 provides a flowchart illustrating a play frame function of a jitter buffer of the receiver of FIG. 1.

The play frame function 1300 is represented in the source codes of Appendix C by the function command of "PlayFrame ( )," and is illustrated by the flow chart shown in FIG. 7. The play frame function 1300 starts with Step 1301. A determination is then made in Step 1302 of whether the frame provided by the time out function 1200 is empty or missing. If so, a further determination is made of whether the jitter buffer is real in Step 1303. If so, a silence frame (i.e., an SID) is played by the real jitter buffer in Step 1304, and the play frame function 1300 stops in Step 1305. If the jitter buffer is not real, however, then a silence frame is not played (i.e., Step 1304 is skipped), and the play frame function 1300 simply stops with Step 1305.

If the frame provided by the time out function 1200 is not empty or missing, then the play frame function 1300 continues with Step 1306. Similar to Step 1303, in Step 1306, a determination is made of whether the jitter buffer is real. If so, the frame is played by the real jitter buffer and sent to the decoder 518, in Step 1307. If the jitter buffer is not real, however, then the play frame function 1300 stops with Step 1305. It should be understood that regardless of whether the jitter buffer is real or not, and regardless of whether a frame is played out, statistics for the jitter buffer are preferably recorded for performance evaluation, as discussed in more detail below.

Figure 8:
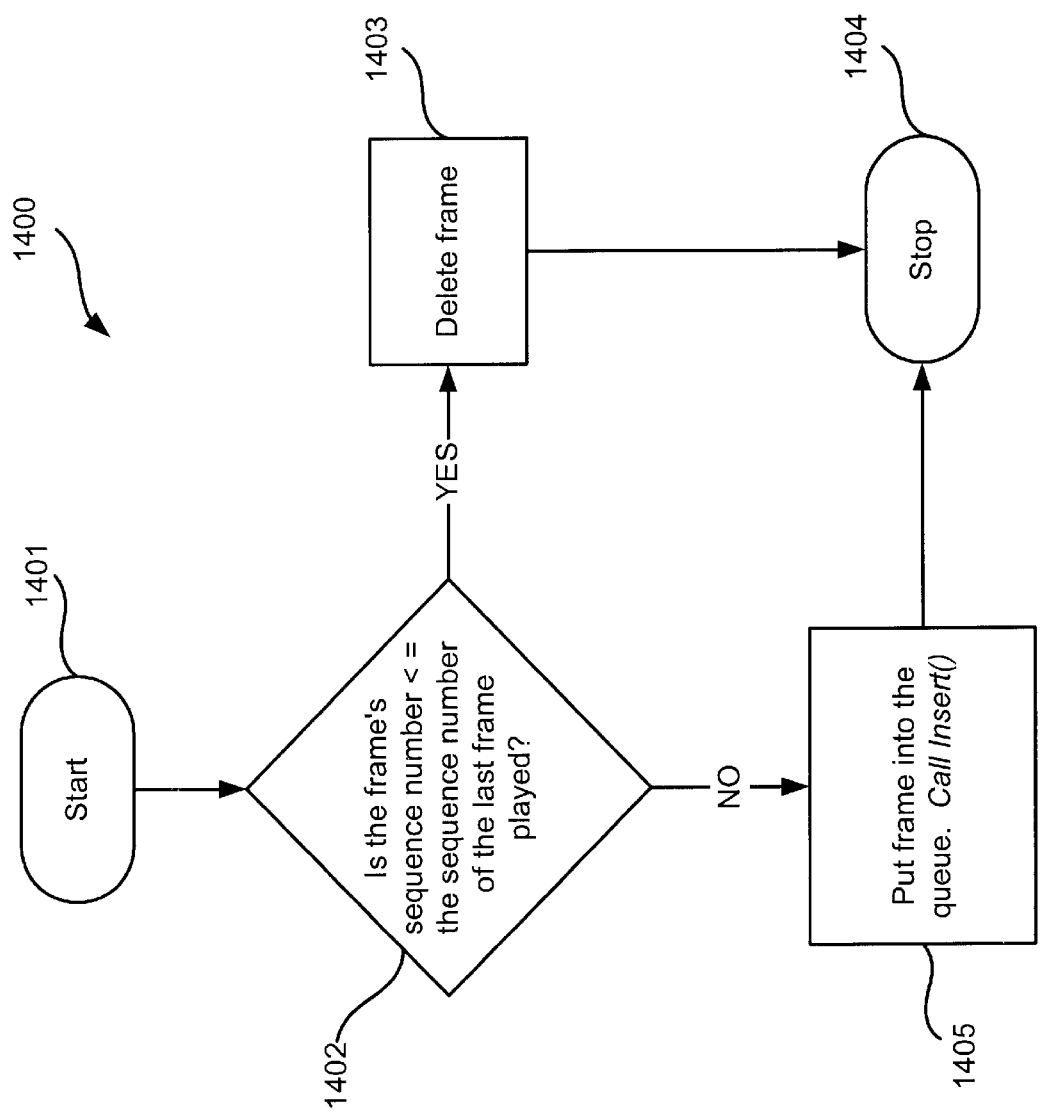
FIG. 8 provides a flowchart illustrating an arrival function of a jitter buffer of the receiver of FIG. 1.

Another function performed by the jitter buffers is the arrival function 1400, which is represented in the source codes of Appendix C by the function command of "Arrival ( )," and is illustrated by the flow chart shown in FIG. 8. The arrival function 1400 starts with Step 1401 and continues with Step 1402, where a determination is made of whether an arriving frame's sequence number is less than or equal to the sequence number of the last frame played by the jitter buffer. If so, the frame is deleted in Step 1403, and the arrival function stops in Step 1404. On the other hand, if the arriving frame's sequence number is greater than the sequence number of the last frame played, then the arriving frame is placed into the queue of the jitter buffer in Step 1405. Step 1405 may also be referred to as an insert function, which is described in more detail below. After Step 1405, the arrival function stops with Step 1404.

Figure 9:
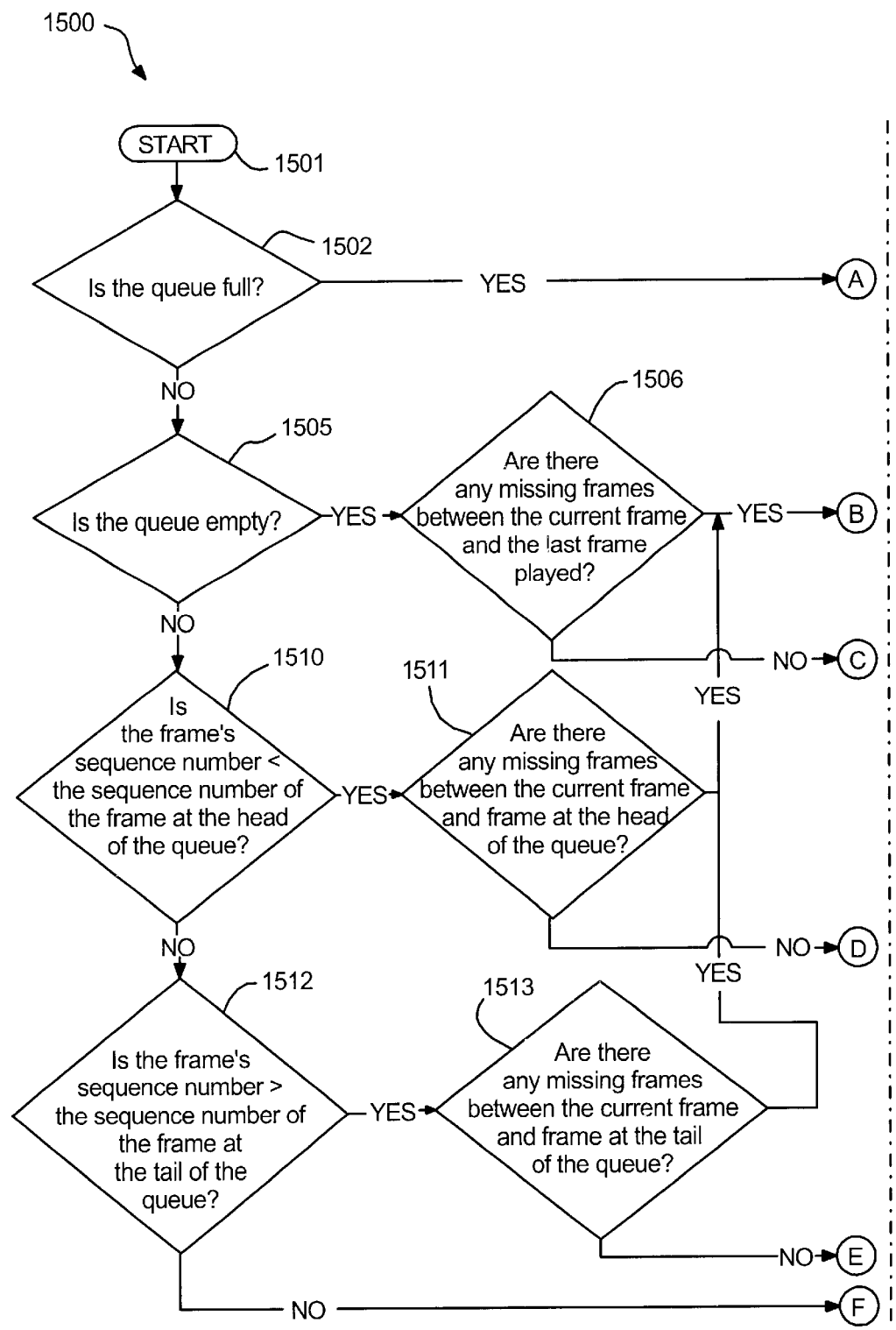
FIG. 9 provides a flowchart illustrating an insert function of a jitter buffer of the receiver of FIG. 1.
Figure 9:
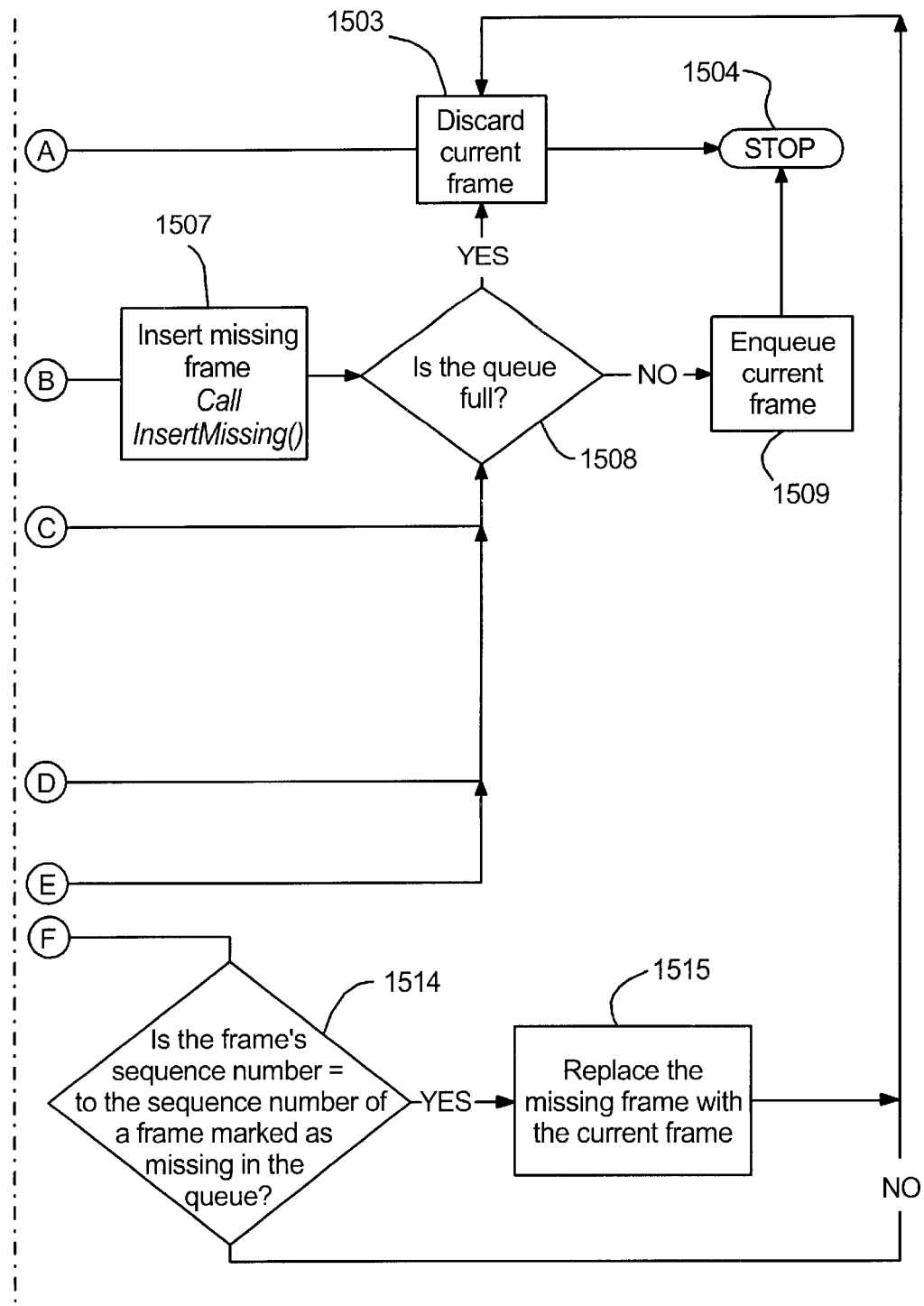

The insert function 1500 performed by the jitter buffers is represented in the source codes of Appendix C by the function command of "Insert ( )," and is illustrated by the flow chart shown in FIG. 9. The insert function 1500 starts with Step 1501 and proceeds with a determination of whether the queue of the jitter buffer is full in Step 1502. If the queue is full, the frame provided by the arrival function 1400 (see Step 1405) is discarded by the jitter buffer in Step 1503, and the insert function 1500 stops in Step 1504. If the queue is not full, however, a further determination is made in Step 1505 of whether the queue is empty. If the queue is empty, yet another determination is made in Step 1506 of whether there are any missing frames between the current frame from the arrival function 1400 and the last frame played by the play frame function 1300. If so, the missing frames are inserted by an insert missing function in Step 1507. The insert missing function is represented in the source codes of Appendix C by the function command of "InsertMissing ( )," and is described in more detail below. After the missing frames are inserted in Step 1507, another determination of whether or not the queue is full is made in Step 1508. If the queue is full, the current frame is discarded in Step 1503. Otherwise, the current frame is placed in the queue in Step 1509. After discarding or inserting the current frame, the insert function 1500 then stops with Step 1504, as shown in FIG. 9. If there weren't any missing frames between the current frame and the last frame played (see Step 1506), then the insert function skips 1507 and proceeds directly to Step 1508.

If the queue was not empty in Step 1505, then another determination is made in Step 1510 of whether the current frame's sequence number is less than the sequence number of the frame at the head of the queue. If so, similar to Step 1506, a further determination is made of whether there are any missing frames between the current frame and the frame at the head of the queue, in Step 1511. Any missing frames are inserted in Step 1507. Otherwise, the insert function 1500 proceeds with Step 1508. If the current frame's sequence number was greater than the sequence number of the frame at the head of the queue in Step 1510, the insert function 1500 continues with Step 1512. In Step 1512, a determination is made of whether the current frame's sequence number is greater than the sequence number of the frame at the tail of the queue. If so, similar to Steps 1506 and 1511, a further determination is made in Step 1513 of whether there are any missing frames between the current frame and the frame at the tail of the queue. Any missing frames are inserted by the insert missing function of Step 1507. Otherwise, the insert function proceeds with Step 1508.

If the current frame's sequence number, however, is less than the sequence number of the frame at the tail of the queue in Step 1512, then a final determination is preferably made in Step 1514 of whether the current frame's sequence number is equal to the sequence number of a frame that is marked as missing in the queue. If so, then the frame marked as missing in the queue is replaced in Step 1515 with the current frame. If not, the insert function 1500 discards the current frame in Step 1503, and stops with Step 1504.

In other words, there are preferably five cases with which a current frame provided by the arrival function 1400 (see Step 1405) will be handled by the insert function 1500. In the first case (see Steps 1502 and 1503), if the queue of a jitter buffer is full, the current frame is discarded. In the second case (see Steps 1505 and 1506), if the queue is empty, and if there are missing frames between the current frame and the frame last played by the play frame function 1300, the missing frames are preferably inserted with the insert missing function (i.e., Step 1507) described below. In addition, if there is still room in the queue, the current frame is also inserted (see Step 1511). In the third case (see Step 1510), if there is room in the queue of the jitter buffer, the current frame is also appended to the front of the queue. Additionally, if there are any missing frames between the current frame and the frame at the front of the queue (see Step 1511), the missing frames are preferably inserted by the insert missing function described below. In the fourth case (see Step 1512), if there is room in the queue of the jitter buffer, the current frame is appended to the tail of the queue. Once again, if there are missing frames between the current frame and the frame at the tail of the queue (see Step 1513), the missing frames are preferably inserted with the insert missing function described below. Finally, in the fifth case (see Step 1514), a frame already in the queue that is marked as missing is preferably replaced by an equivalent current frame. It should be noted that if the current frame does not fit into one of the above five cases, then the current frame must be a duplicate of an already existing frame, thereby resulting in the current frame being discarded by the jitter buffer.

Figure 10:
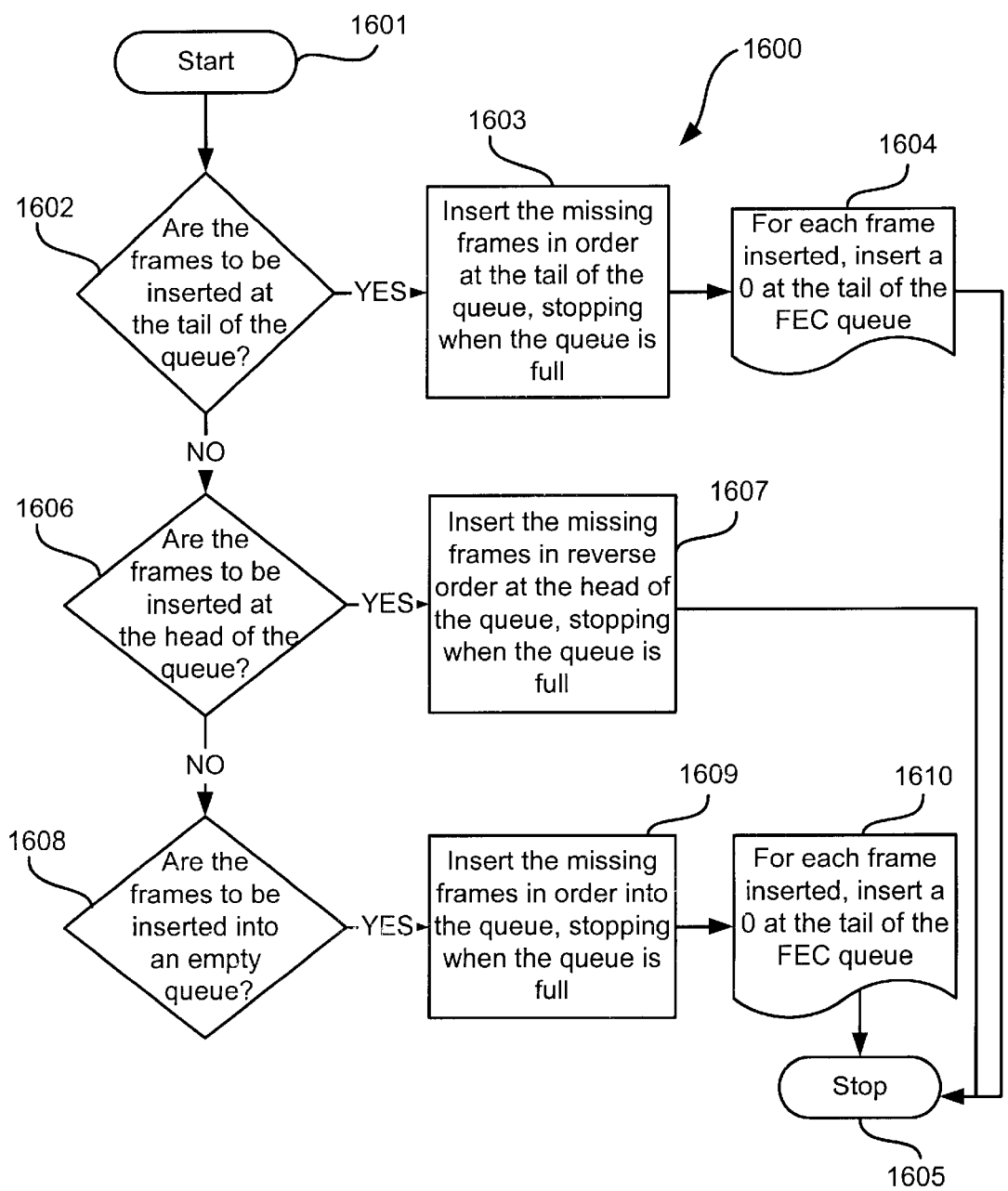
FIG. 10 provides a flowchart illustrating an insert missing function of a jitter buffer of the receiver of FIG. 1.

As shown in FIG. 10, the insert missing function 1600 starts with Step 1601. A determination is then made in Step 1602 of whether the missing frames are to be inserted at the tail of the queue. If so, the missing frames are inserted in proper sequential order at the tail of the queue in Step 1603. The missing frames may only be inserted at the tail of the queue, however, to the extent the queue is empty. Moreover, for each missing frame inserted, a "zero" is preferably inserted at the tail of the FEC queue of the jitter buffer in Step 1604. The insert missing function 1600 then stops in Step 1605.

If the missing frames are not to be inserted into the tail of the queue, a determination is made in Step 1606 of whether the missing frames are to be inserted at the head of the queue. If so, the missing frames are inserted, preferably in reverse sequential order, at the head of the queue in Step 1607. Once again, missing frames are only inserted in Step 1607 to the extent that the queue is empty. After Step 1607 is completed, the insert missing function 1600 stops with Step 1605.

If the frames are not to be inserted either at the tail of the queue or at the head of the queue, the insert missing function 1600 continues with Step 1608, where a determination is made of whether the frames are to be inserted into any other portion (i.e., between the tail and the head) of the queue. If so, to the extent that the queue is empty, the missing frames are inserted in sequential order into the queue in Step 1609. Similar to Step 1604, for each missing frame inserted, a "zero" is inserted at the tail end of the FEC queue in Step 1610. Next, the insert missing function 1600 stops with Step 1605. The insert missing function 1600 also stops with Step 1605 if the missing frames were not to be inserted into the queue according to Step 1608. It should be noted that if the queue becomes full and there are still more missing frames to insert, the remaining missing frames are preferably discarded.

Decoder 518 decompresses the forwarded frames 534. Decompressed frames 563 are then forwarded to a digital-to-analog (D/A) converter 520. D/A converter 520 converts the digital frames 563 to an analog output 565. Analog output 565 represents original analog input 572 generated by the first calling device 570. Analog output 565 is forwarded to a listening device 522 for playout.

As previously mentioned, exemplary buffer array 514 includes a plurality of jitter buffers 531, 532, and 533. Each jitter buffer 531, 532, 533 receives unpacked frames from module 512. Preferably the jitter buffers 531,532, 533 have various associated jitter buffer values. Such values may include by way of example, and without limitation, operating characteristics such as steady-state buffer playout depth, maximum buffer depth, redundancy coding, and/or FEC coding.

Periodically, the jitter buffer values are evaluated. To mask the varying transporting nature of medium 535, the performance of each individual jitter buffer in array 514 is evaluated according to certain system sensitivities. The jitter buffer that results in computationally-desirable transporting characteristics vis-à-vis the sensitivities during a specific period of time is selected as the computationally-desirable or real jitter buffer. The remaining jitter buffers are used as virtual buffers. It is only the computationally-desirable or real jitter buffer that forwards frames to the decoder for playout of real time input, preferably during a subsequent talk spurt or burst. A talk spurt or burst, as that term is herein used, means the time period extending between two successive silence periods.

The performance of each individual jitter buffer is periodically or intermittently evaluated. Preferably, where calling device 570 and listening device 522 are engaged in a telephone conversation, each jitter buffer is evaluated at the end of a talk spurt, or when a silence is detected by the receiver, i.e., when a SID frame or a predetermined number of sequential SID frames are received. Therefore, during an interactive real time media session, various jitter buffers of array 514 may be selected at varying times to act as the computationally-desirable or real jitter buffer, or alternatively to serve as a virtual jitter buffer.

Independent jitter buffer evaluation may be explained by way of example. By way of example, and without limitation, the array of jitter buffers 514 may be evaluated at time t=N. Based on this evaluation, it may be determined that jitter buffer 533 is the computationally-desirable or real jitter buffer, and therefore forwards its buffered frames to decoder 518 for playout during the next talk spurt. In contrast, jitter buffers 531 and 532 are virtual jitter buffers that do not forward their buffered frames to decoder 518 for playout. Assume further that, at t=N+1, jitter buffers 516 are once again evaluated, and it is determined that jitter buffer 531 is now the computationally-desirable or real jitter buffer. The previous computationally-desirable or real jitter buffer 533 no longer forwards frames to decoder 518 (i.e., jitter buffer 533 is now only a virtual buffer). Now, the new computationally-desirable jitter buffer 531 acts as the real jitter buffer and forwards its buffered frames to the decoder 518.

One advantage of periodic independent jitter buffer evaluation is that it allows a large number of buffer parameters to be compared and evaluated. Another advantage of individual evaluation is that it allows various error correcting codes and/or packet redundancy methods to be compared and evaluated. By periodic independent jitter buffer comparison and evaluation, receiver 516 may dynamically respond to a range of network transporting characteristics.

Another advantage of such a system is that receiver 510 may dynamically adjust to potential user definable operating requirements. For example, a user may desire certain system operation parameters such as error correction coding, redundancy, or bandwidth limitations upon communication channel 500. If such operating conditions are desired, receiver 510 may take these desired conditions into account during jitter buffer evaluation. Such operating requirements may also be imposed via management software, such as a configuration file, as discussed above. It should also be understood that the operation conditions may be purposely non-optimal, depending on desired operating characteristics and user preferences. For instance, a user or organization may desire FEC for all voice streams to improve accuracy, despite the fact that it may result in an increased and non-optimal use of bandwidth.

Jitter buffer array 514 may be evaluated in accordance with a number of different operating parameters that result in certain system sensitivities. Various parameters may be associated with each jitter buffer. Associated parameters may include by way of example, and without limitation, the steady-state jitter buffer playout depth, maximum jitter buffer depth. Other parameters could include whether a jitter buffer implements redundancy coding and/or FEC coding.

As the term is used herein, the term steady state jitter buffer playout depth means the number of frames that a jitter buffer tries to maintain in a packet queue. Maximum virtual buffer depth means the maximum jitter buffer frame size. As previously described, the term redundancy refers to the number of previous frames packed into a data packet with the current frame. Moreover, the FEC coding may include any desirable scheme, such as the first and second FEC schemes described above.

Essentially, jitter buffer evaluation is a tradeoff between packet delay (i.e., buffer depth), packet loss, and bandwidth. The array of buffers may be evaluated according to administratively chosen sensitivities. Preferably, jitter buffers are evaluated based on sensitivities related to packet delay, packet loss, and bandwidth. Alternatively, jitter buffers may be evaluated according to other sensitivities, such as packet variance. By evaluating the various jitter buffers based on such sensitivities, receiver 510 may dynamically adjust to a various range of communication channel and user requirements.

Preferably, the periodic jitter buffer evaluation refers to a number of packets or an amount of time large enough for the collected statistics to provide a meaningful evaluation. The length of an evaluation period is dependant upon the voice coder-decoder (codec) implemented. In addition, the longer the evaluation period, the more data present for making a decision as to the performance of the jitter buffers. A longer evaluation period with more data results in a better decision as to which jitter buffer is performing the best. However, the longer the evaluation period, the longer the wait for a computationally-desirable jitter buffer to be selected, and the longer a user may have to endure a lower quality conversation. Accordingly, the length or duration of an evaluation period should be long enough to obtain a meaningful decision as to the performance of the jitter buffers, but short enough to enable frequent selection of the computationally-desirable jitter buffer. Preferably, the evaluation period is as least as long as a round trip packet delay for a given conversation, but no longer than twenty round trip packet delays.

Where input is a telephone conversation, the length of an evaluation period may depend on talk spurt dynamics. In other words, the jitter buffers are evaluated once receiver 510 detects a SID frame or a threshold number of sequential SID frames. In general, where real time media input is a telephone conversation, buffers may be evaluated during the silence between talk spurts.

Preferably, jitter buffer values are evaluated as to how the values effect the overall system sensitivity, which is predicated on sensitivity settings. Preferably, sensitivity settings may include packet delay (Sd), packet loss (Sl), and bandwidth (Sb). These sensitivities may be static or dynamic, depending on administrative and user preferences, and may be user definable or determined by a network management software, such as a configuration file (discussed above). While static settings are relatively quick and simple, dynamic settings may allow feedback and adjustments to changing network conditions.

Figure 11:
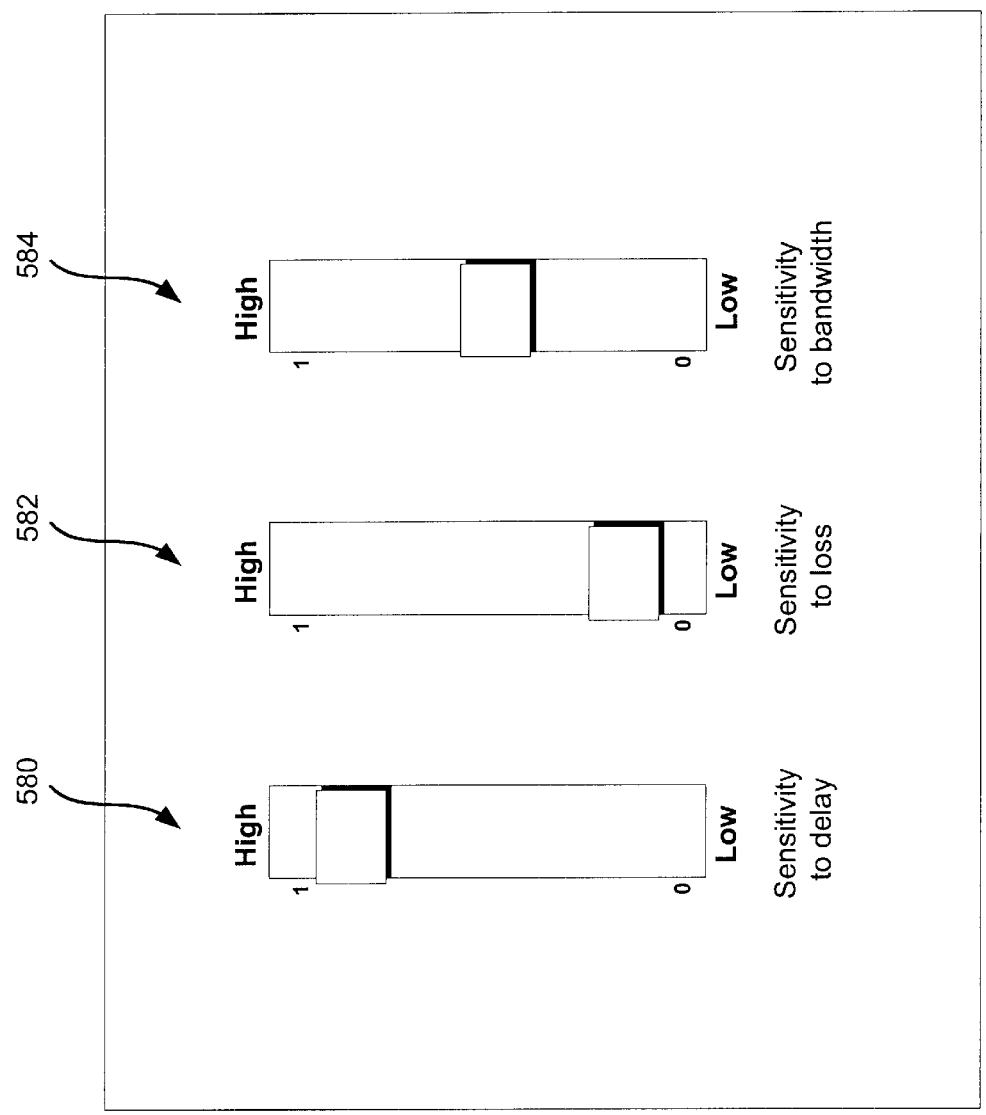
FIG. 11 provides a graphical representation for selecting a computationally-desirable jitter buffer from the receiver set shown in FIG. 1.

FIG. 11 provides an exemplary implementation of three sensitivity settings 580, 582 and 584 for the communication channel 500 shown in FIG. 1. In this exemplary implementation, only three sensitivity settings are provided. Alternatively, a greater or lesser number of settings may be selected according to the desired overall system sensitivity. Sensitivity is represented as a slide bar that ranges in value from 0 to 1 on a continuous scale. With such a scale, the closer to 1 the sensitivity setting is, the more sensitive the evaluation scheme will be to the user defined sensitivity. The closer to 0 the sensitivity setting is, the less sensitive the evaluation scheme is to that particular parameter. Consequently, the exemplary implementation provided in FIG. 11 is generally sensitive to delay, moderately sensitive to bandwidth, and generally insensitive to packet loss.

Where system sensitivities are determined by software, some knowledge of the voice codec being used and the current state of the network may be required. For example, a G.711 codec requires more bandwidth than a G.723.1 codec. Likewise, a short codec, such as a G.729A codec, with 10 ms frames, is three times as sensitive to jitter and packet variance as a longer codec, such as a G.723.1 codec, with 30 ms frames. Such information about the voice codec being used and the current state of the network may be recorded and provided by the buffer management module. Assuming that this information is available, bandwidth sensitivity may be set based on current network load, the sensitivity to loss could be based on the ability of the voice codec to conceal lost packets, and the delay sensitivity could be based on the end-to-end latency of the current voice path through the network, as well as the frame size of the codec.

In the exemplary embodiment illustrated in FIG. 1, each jitter buffer computes and maintains its independent values that may include the mean buffer depth (d), the mean loss rate (l), and the required bandwidth (b). The mean buffer depth (d) is determined from sampling. A sampling rate may be periodic or intermittent with its period set equal to a constant or varying frame duration. Preferably, the sampling rate is continuously varied by basing its period on a diversity of randomly generated values. Although additional hardware and/or software may be required, the buffer depth (d) may also be sampled according to a Poisson-like process. As known in the art, a Poisson process is a method for performing unbiased sampling based on well-known mathematical principles. In any event, a varied sampling rate is preferred since it is less sensitive to system periodicity and produces less biased samples.

Mean packet loss (l) may be periodically determined by counting packet losses and packet arrivals, preferably over a duration of a current talk spurt. The bandwidth (b) requirement is generally a constant, since this requirement is based on a per-buffer basis. In other words, different buffers will have different bandwidth requirements, since the buffers comprising the buffer array may have different characteristics, such as redundancy or FEC coding.

Preferably, the buffer depth (d), mean packet loss (l), and bandwidth (b) values are normalized from 0 and 1. Consequently, the smaller the normalized value, the greater the end-user and therefore system quality. For example, since the mean packet loss rate (l) already takes on values between 0 and 1, a lower value is more desirable in terms of end-user quality.

Buffer depth (d) and bandwidth (b) are normalized with respect to the largest value that the buffer can take on in a given receiver. For buffer depth, the greatest depth that any jitter buffer is programmed to maintain at steady state, and divide each jitter buffer's mean depth by this steady state number.

For bandwidth (b), the greatest degree of per-frame overhead (not including packet headers) used by any virtual buffer is determined. The per-frame overhead of each virtual buffer is divided by this number.

The following example provides an illustration of how the jitter buffer values are normalized and is not intended as a limitation. Assume that an IP telephony receiver, such as the receiver 510 shown in FIG. 1, includes a buffer array comprising a set of jitter buffers. Further assume that the greatest steady-state buffer depth used by any jitter buffer of the array is 6 frames. Also assume that, in the context of this example, the greatest redundancy used by any of the jitter buffers is 3 frames.

Now assume that, after a certain period of time, the jitter buffers have computed their independent values. Further assume that, during this period of time, one of the jitter buffers had a mean depth of 3 frames, had a packet loss rate of 5%, and had a bandwidth of 2. For this specific jitter buffer, then, the following jitter buffer values may be computed as follows:

Buffer depth=(d)=(mean depth of 3)/(greatest steady state depth 6)=0.5

Mean loss rate=(l)=5% or 0.05

Bandwidth=(b)=(buffer per-frame overhead 2)/(greatest degree of per-frame overhead 3)=0.66

These values are then computed for each jitter buffer. These values are then used to compute a jitter buffer quality (q) for each buffer. The relative jitter buffer quality provides a general measure of the quality of service a jitter buffer would have provided during a previous period of time. By way of example, and without limitation, an exemplary jitter buffer quality may take into account one or more jitter buffer values, as well as one or more system sensitivities. An exemplary jitter buffer quality may be represented by the equation:

$$q=S_d*d+S_l*l+S_b*b$$

Returning to the sensitivity settings of the example illustrated in FIG. 11, the sensitivity settings may be approximated as $S_d=1$, $S_l=0$, and $S_b=0.5$. Based on these sensitivity settings, the hypothetical jitter buffer would result in the following jitter buffer quality:

$$q=(1)*(0.5)+(0)*(0.05)+(0.5)(0.66)=0.83$$

The q value for the remaining jitter buffers would also be computed. Based on the resulting quality computations, the computationally-desirable or real jitter buffer is chosen to be the jitter buffer generating the smallest value for q.

In a preferred embodiment, jitter buffer delay and loss characteristics are calculated on a per talk spurt or burst basis. Preferably, a determination of jitter buffer performance is made during each silence period following a talk spurt or burst. A potential disadvantage of this type of evaluation is that it may lead to oscillation between one or more jitter buffers if, for example, the network behavior changes dramatically during periodic buffer evaluation. In order to smooth out the effects of transient conditions, the current delay and loss characteristics may be computed using an exponentially weighted moving average (EWMA) over a window of the last n talk spurts.

In a preferred embodiment, jitter buffer evaluation uses first-order statistics for packet delay and loss. Alternatively, second-order statistics, such as the variation of delay and loss, may also be computed. A selection scheme using this information could attempt to minimize these second-order statistics, as well as the first-order statistics. Second-order statistics are well-known in the art, and are usually based on the second moment of a data set. While variance is commonly used in second order statistics, mean absolute deviation may also be used, especially since mean absolute deviation is relatively easy to calculate in real time. Inter-quartile range is another second-order statistic that may be computed and used.

By monitoring various transporting characteristics of the transporting network 535, communication channel 500 offers a number of advantages. For example, the transmitter 502 and the receiver 510 periodically adapts to varying transporting dynamics and conditions of the transporting network 535. For a non-guaranteed packet switched network, the network transporting dynamics may be assessed by way of the jitter buffer array by evaluating various transporting characteristics such as the packet delay distribution, error correction coding, and packet loss percentage, all of which may or may not be implemented at a given period of packet transportation.

It should be readily apparent from the forgoing description and accompanying drawings that the present invention overcomes the problems associated with the prior art, especially the problems identified above in the background section. It should also be understood that the evaluation and sensitivities of the present invention for buffer performance may be used with other buffer systems not described herein. In addition, it should further be understood that other evaluations and sensitivities for buffer performance not described herein may be used with the buffer system of the present invention.

Those skilled in the art to which the invention pertains may make modifications in other embodiments employing the principles of this invention without departing from its spirit or essential characteristics, particularly upon considering the foregoing teachings. Accordingly, the described embodiments are to be considered in all respects only as illustrative, and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

We claim:

1. A gateway for receiving a transported stream of data packets comprising:

a buffer management device receiving the data packets, unpacking the data packets and forwarding a stream of data frames;

a first jitter buffer receiving the data frames from the buffer management device and buffering the data frames;

a second jitter buffer receiving the data frames from the buffer management device and buffering the data frames;

a computationally-desirable jitter buffer selected from the first jitter buffer or the second jitter buffer, the computationally-desirable jitter buffer selected by comparing a first jitter buffer quality and a second jitter buffer quality; and a decoder receiving buffered data frames from the computationally-desirable jitter buffer.

2. The invention of claim 1 wherein the buffer management device uses one of redundancy and forward error correction coding to recover lost data packets.

3. The invention of claim 1 wherein the jitter buffer quality comprises at least one jitter buffer value and at least one receiver sensitivity setting.

4. The invention of claim 3 wherein the jitter buffer value is selected from a group including mean buffer depth, mean loss rate, and bandwidth.

5. The invention of claim 3 wherein the receiver sensitivity setting is selected from the group including packet delay, packet loss, and bandwidth.

6. The invention of claim 1 wherein the decoder plays out the data frames received from the computationally-desirable jitter buffer.

7. The invention of claim 1 wherein the jitter buffer quality is user definable.

8. The invention of claim 1 wherein the computationally-desirable jitter buffer is periodically selected.

9. The invention of claim 3 wherein the sensitivity setting is user definable.

10. The invention of claim 1 wherein the jitter buffer quality is used for evaluating a dynamic characteristic of a transporting medium that transports the data packets from an encoding device to the gateway.

11. The invention of claim 1 wherein the jitter buffer quality is computed using an exponentially weighted moving average.

12. The invention of claim 11 wherein the exponentially weighted moving average is computed over a plurality of time periods.

13. The invention of claim 1 wherein the jitter buffer quality is computed using a second-order statistical analysis.

14. The invention of claim 13 wherein the second-order statistical analysis is a Poisson process.

15. A method for receiving a transported stream of data packets comprising the steps of:

receiving the data packets at a management module;

unpacking the data packets at the management module;

forwarding a first stream of data frames to a first jitter buffer;

forwarding a second stream of data frames to a second jitter buffer;

buffering the data frames at the first jitter buffer and the second jitter buffer;

computing a first jitter buffer quality for the first jitter buffer and a second jitter buffer quality for the second jitter buffer;

selecting either the first or the second jitter buffer as a computationally-desirable jitter buffer based on the first and second jitter buffer qualities; and forwarding the buffered data frames from the computationally-desirable buffer to a decoder.

16. The invention of claim 15 wherein the jitter buffer quality comprises at least one jitter buffer value and at least one receiver sensitivity setting.

17. The invention of claim 16 wherein the jitter buffer value is selected from a group including mean buffer depth, mean loss rate, and bandwidth.

18. The invention of claim 16 wherein the receiver sensitivity setting is selected from a group including packet delay, packet loss, and bandwidth.

19. The invention of claim 15 further comprising the step of playing out the data frames received from the computationally-desirable jitter buffer.

20. The invention of claim 15 wherein the jitter buffer quality is user definable.

21. The invention of claim 15 further comprising the step of periodically selecting the computationally-desirable jitter buffer.

22. The invention of claim 16 wherein the sensitivity setting is user definable.

23. The invention of claim 15 further comprising the step of evaluating dynamic characteristics of a network that transports the data packets from an encoding device to the gateway.

24. The invention of claim 15 further comprising the step of computing the jitter buffer quality as an exponentially weighted moving average.

25. The invention of claim 24 further comprising the step of computing the exponentially weighted moving average over a plurality of time periods.

26. The invention of claim 15 wherein the jitter buffer quality is computed using a second-order statistical analysis.

27. The invention of claim 15 further comprising the step of simulating the arrival of further redundancy frames for each jitter buffer with a redundancy value greater than a redundancy value of the data packets.

28. The invention of claim 15 further comprising the step of simulating the arrival of forward error correction frames for each jitter buffer with an forward error correction scheme.

29. The invention of claim 15 further comprising the step of forwarding a silence frame from the computationally-desirable buffer to the decoder when there is no buffered data frame present in the computationally-desirable buffer.

30. The invention of claim 15 further comprising the steps of recovering missing data frames and inserting the missing data frames into at least one of the jitter buffers.

31. The invention of claim 26 wherein the second-order statistical analysis is a Poisson process.

* * * * *